US012071601B2

(12) United States Patent
Man et al.

(10) Patent No.: US 12,071,601 B2
(45) Date of Patent: Aug. 27, 2024

(54) SURFACTANT PACKAGE FOR HIGH FOAMING DETERGENTS WITH LOW LEVELS OF C9-C11 LINEAR ALCOHOLS

(71) Applicant: ECOLAB USA INC., Saint Paul, MN (US)

(72) Inventors: Victor Fuk-Pong Man, Saint Paul, MN (US); Amanda R. Blattner, Saint Paul, MN (US); Derrick Anderson, Saint Paul, MN (US); Gang Pu, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 3 days.

(21) Appl. No.: 17/577,233

(22) Filed: Jan. 17, 2022

(65) Prior Publication Data

US 2022/0162525 A1 May 26, 2022

Related U.S. Application Data

(63) Continuation of application No. PCT/US2020/033703, filed on May 20, 2020, and a continuation of application No. 15/929,744, filed on May 20, 2020, now Pat. No. 11,261,404.

(60) Provisional application No. 62/850,183, filed on May 20, 2019.

(51) Int. Cl.

| | |
|---|---|
| ***C11D 1/75*** | (2006.01) |
| ***C11D 1/94*** | (2006.01) |
| ***C11D 3/00*** | (2006.01) |
| ***C11D 3/20*** | (2006.01) |
| ***C11D 3/34*** | (2006.01) |
| *C11D 1/14* | (2006.01) |
| *C11D 1/72* | (2006.01) |

(52) U.S. Cl.

CPC .............. *C11D 3/0094* (2013.01); *C11D 1/94* (2013.01); *C11D 3/2048* (2013.01); *C11D 3/3418* (2013.01); *C11D 1/143* (2013.01); *C11D 1/146* (2013.01); *C11D 1/72* (2013.01)

(58) Field of Classification Search

CPC .... C11D 1/02; C11D 1/75; C11D 1/83; C11D 3/2013; C11D 7/262; C11D 3/0094

See application file for complete search history.

(56) References Cited

U.S. PATENT DOCUMENTS

| | | | | |
|---|---|---|---|---|
| 2,956,026 A | 10/1960 | Lew | | |
| 3,554,916 A | 1/1971 | Kerfoot et al. | | |
| 3,964,500 A * | 6/1976 | Drakoff | A61K 8/731 | 510/471 |
| 4,013,595 A * | 3/1977 | Podella | C11D 1/146 | 510/342 |
| 4,442,018 A | 4/1984 | Rand | | |
| 5,424,010 A | 6/1995 | Duliba et al. | | |
| 5,876,514 A | 3/1999 | Rolando et al. | | |
| 5,967,157 A | 10/1999 | Chatterjee et al. | | |
| 6,221,822 B1 | 4/2001 | Crutcher et al. | | |
| 10,843,154 B1 | 11/2020 | Burton et al. | | |
| 2003/0074748 A1 | 4/2003 | Patel et al. | | |
| 2003/0116748 A1 | 6/2003 | Haslim | | |
| 2004/0121935 A1 | 6/2004 | Klaers et al. | | |
| 2004/0157754 A1* | 8/2004 | Geary | B82Y 5/00 | 510/119 |
| 2006/0069220 A1 | 3/2006 | Muers et al. | | |
| 2007/0232516 A1* | 10/2007 | Anthony | C11D 3/0094 | 510/421 |
| 2007/0275868 A1 | 11/2007 | Cooremans et al. | | |
| 2008/0023031 A1* | 1/2008 | Kellar | C11D 1/02 | 134/6 |
| 2008/0233057 A1* | 9/2008 | Viladot Petit | A61Q 11/00 | 424/49 |
| 2009/0253603 A1* | 10/2009 | Uchiyama | C11D 1/8305 | 510/159 |
| 2012/0046213 A1 | 2/2012 | Braeckman et al. | | |
| 2012/0046214 A1 | 2/2012 | Braeckman et al. | | |

(Continued)

FOREIGN PATENT DOCUMENTS

| | | |
|---|---|---|
| CN | 108060024 A | 5/2018 |
| DE | 2163195 A1 | 7/1973 |

(Continued)

OTHER PUBLICATIONS

Du et al., "Preparation and properties of microemulsion detergent with linear medium chain fatty alcohols as oil phase", Journal of Molecular Liquids, vol. 223, pp. 805-810, Nov. 2016.

(Continued)

*Primary Examiner* — Charles I Boyer

(74) *Attorney, Agent, or Firm* — McKee, Voorhees & Sease, PLC

(57) ABSTRACT

The present invention relates to a surfactant booster for use in high foaming cleaning compositions. In an aspect of the invention, a C6, C7, C8, C9, C10, C11 or C12 linear alcohol in very low amounts is added to increase surface activity, foam and wetting properties of the composition. The alcohol is added in an amount of alcohol to surfactant of about 1:100 to 1:200 and must be linear. In another aspect, the invention relates to novel cleaning compositions such as pot and pan soaking compositions, dishwashing compositions, food and beverage foaming cleaners, vehicle cleaning and the like suitable for use in hard water, which can be solid or liquid. The invention further relates to methods of making these compositions, and to methods employing these compositions.

12 Claims, 11 Drawing Sheets

(56) References Cited

U.S. PATENT DOCUMENTS

| | | | |
|---|---|---|---|
| 2012/0291818 A1 | 11/2012 | Monsrud et al. | |
| 2013/0102803 A1* | 4/2013 | Kapsner | A61Q 5/02 554/92 |
| 2015/0005222 A1 | 1/2015 | Hunt, Jr. et al. | |
| 2015/0353868 A1* | 12/2015 | Bettiol | C11D 3/2006 510/235 |
| 2017/0088796 A1 | 3/2017 | Hodge et al. | |
| 2017/0258701 A1* | 9/2017 | Molenda | A61K 8/731 |
| 2018/0265825 A1* | 9/2018 | Park | C11D 1/94 |
| 2020/0032173 A1 | 1/2020 | Miracle et al. | |
| 2020/0078284 A1* | 3/2020 | Botto | A61K 8/8152 |
| 2020/0216676 A1 | 7/2020 | Torres et al. | |
| 2020/0248102 A1 | 8/2020 | Scheibel et al. | |

FOREIGN PATENT DOCUMENTS

| | | | |
|---|---|---|---|
| EP | 0979865 | A1 | 2/2000 |
| EP | 1757676 | A1 | 2/2007 |
| EP | 1727850 | B1 | 8/2007 |
| JP | 2001010935 | A | 1/2001 |
| JP | 2004091522 | A | 3/2004 |
| JP | 2007177085 | A | 7/2007 |
| JP | 2010138348 | A | 6/2010 |
| JP | 2012057048 | A | 3/2012 |
| JP | 2017186491 | A | 10/2017 |
| WO | 9705223 | A1 | 2/1997 |
| WO | 9920723 | A2 | 4/1999 |
| WO | 0042152 | A1 | 7/2000 |
| WO | 2008005962 | A2 | 1/2008 |
| WO | 2014084885 | A1 | 6/2014 |
| WO | 2015188072 | A1 | 12/2015 |
| WO | 2017058934 | A1 | 4/2017 |
| WO | 2017069017 | A1 | 4/2017 |

OTHER PUBLICATIONS

Mitrinova et al., "Control of surfactant solution rheology using medium-chain cosurfactants", Colloids and Surfaces A, vol. 537, pp. 173-184, 2018.

Shiao et al., "Chain length compatibility effects in mixed surfactant systems for technological applications", vol. 74, pp. 1-29, 1998.

International Searching Authority in connection with PCT/US2020/033703 filed May 20, 2020, "The International Search Report and the Written Opinion of the International Searching Authority, or the Declaration", 23 pages, mailed Sep. 9, 2020.

* cited by examiner

SURFACTANT PACKAGE FOR HIGH FOAMING DETERGENTS WITH LOW LEVELS OF C9-C11 LINEAR ALCOHOLS

CROSS-REFERENCE TO RELATED APPLICATION

This application is a Continuation Application of U.S. Ser. No. 15/929,744, filed May 20, 2020, and claims priority to PCT/US2020/033703, filed May 20, 2020, which applications claim priority under 35 U.S.C. § 119 to Provisional Application U.S. Ser. No. 62/850,183, filed on May 20, 2019, which are herein incorporated by reference in there entirety including without limitation, the specification, claims, and abstract, as well as any figures, tables, or examples thereof.

FIELD OF THE INVENTION

This disclosure relates to novel cleaning compositions that are high foaming with stable foam and high surface activity. The compositions include a surfactant system that employs medium to long chain linear alcohols in combination with traditional high foaming anionic surfactants. In another aspect the invention relates to novel cleaning compositions such as pot and pan soaking compositions, detergents, dishwashing compositions, food and beverage foaming cleaners, vehicle cleaners, detergents and the like which can be in solid or liquid form. The invention further relates to methods of making these compositions, and to methods employing these compositions.

BACKGROUND OF THE INVENTION

Heavily soiled ware can require multiple cleaning steps to remove the soils from its surfaces. Pots and pans used for prepping, cooking, and baking ware in full service restaurants can be particularly difficult to clean in a dishmachine due to the caramelized soil baked on to the surface of the ware. Some full-service restaurants have attempted to overcome this issue by using, as a pre-step to washing the pots and pans in the dishmachine, a 3-compartment sink for soaking the pots and pans. Exemplary soaking solutions include water, pot and pan detergent solutions, or silverware presoaks. Components of these compositions typically include metal protectors, surfactants, alkalinity sources and the like. Surfactants are the single most important cleaning ingredient in cleaning products. The surfactants reduce the surface tension of water by adsorbing at the liquid-gas interface. They also reduce the interfacial tension between oil and water by adsorbing at the liquid-liquid interface. When dissolved in water, surfactants give a product the ability to remove soil from surfaces. Each surfactant molecule has a hydrophilic head that is attracted to water molecules and a hydrophobic tail that repels water and simultaneously attaches itself to oil and grease in soil. These opposing forces loosen the soil and suspend it in the water.

Surfactants do the basic work of detergents and cleaning compositions by breaking up stains and keeping the soil in the water solution to prevent re-deposition of the soil onto the surface from which it has just been removed. Surfactants disperse soil that normally does not dissolve in water. Environmental regulations, consumer habits, and consumer practices have forced new developments in the surfactant industry to produce lower-cost, higher-performing, and environmentally friendly products.

One such development includes the use of foaming agents to increase contact time on surfaces to be cleaned. Such compositions are presently used in many applications, such as retail, industrial and institutional including grease cutters, clinging lime scale removers, shower wall cleaners, bathtub cleaners, hand sanitizing gels, disinfectant gels, hand-soaps, teat dips, coatings, stabilized enzymes, structured liquids, and the like. The most widely used foaming agent is cocamide DEA, or cocamide diethanolamine, a diethanolamide made by reacting a mixture of fatty acids from coconut oils (cocamide) with diethanolamine. The agent may have also been known as lauramide diethanolamine, Coco Diethanolamide, coconut oil amide of diethanolamine, Lauramide DEA, Lauric diethanolamide, Lauroyl diethanolamide, and Lauryl diethanolamide. These compounds have come under regulatory pressure, so it is desired to have foaming in the absence of these compounds and instead obtain this property with combinations of surfactants and foaming boosters.

Accordingly, it is an objective of this disclosure to provide enhanced soil removal by boosting the surface activity, foaming, and wetting properties of a detergent. In each aspect of the disclosure suitable foam stabilisation is desired while providing safe, environmentally friendly and economically feasible compositions for various applications of use.

It is a further object of the invention to provide a synergistic composition of a foaming surfactant booster and a surfactant package including anionic surfactants to provide such improvements and increase surface activity while maintaining desired foam stabilization and retention.

Other objects, advantages and features of the present invention will become apparent from the following specification taken in conjunction with the accompanying drawings.

BRIEF SUMMARY OF THE INVENTION

Applicants have surprisingly discovered that the incorporation of a very low level of a medium chain linear alcohol into a detergent can significantly boost the surface activity, foam, and wetting properties of the detergent. The ratio of the medium chain linear alcohol to the total anionic surfactants can be as low as 1:100. This is a cost-effective strategy to improve the cleaning of detergents.

The cleaning compositions include a surfactant system comprising a medium to long chain (C6, C7, C8, C9, C10, C11 or C12) linear alcohol in combination with a high foaming anionic surfactant. The surfactant system typically comprises a ratio of alcohol to anionic surfactant of from about 1 to 100 to about 2 to 100. In certain embodiments the compositions also include hexylene glycol as a hydrotrope/humectant. In some embodiments the composition is essentially free of non-linear alcohols and in certain embodiments the composition is essentially free of propylene glycol. Should these compounds be present, for example through contamination, the level of the same shall be less than 0.5 wt. %, may be less than 0.1 wt. %, and often less than 0.01 wt %.

A novel cleaning method is also contemplated and involves applying the cleaning composition to a surface to be cleaned, allowing the composition to remain for a sufficient period of time for cleaning (typically until any foam that is present dissipates) and thereafter rinsing said surface until that said cleaning composition is removed along with soil and debris.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Various embodiments of the present invention will be described in detail with reference to the drawings, wherein like reference numerals represent like parts throughout the several views. Reference to various embodiments does not limit the scope of the invention. Figures represented herein are not limitations to the various embodiments

DETAILED DESCRIPTION OF THE INVENTION

Figure 1:
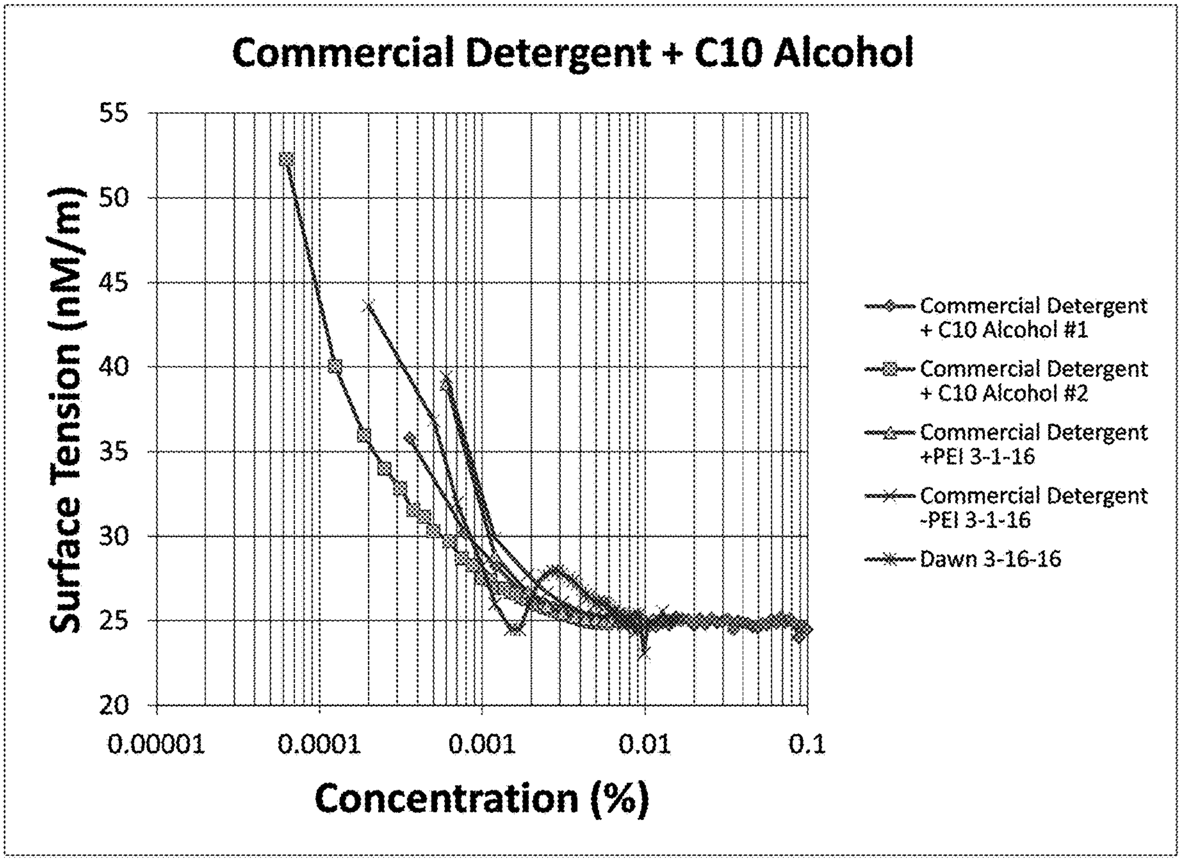
FIG. 1 shows a semi-log plot of static surface tensions vs. concentration for a traditional detergent with no linear alcohol and with 0.138% linear C10 alcohol, and with propylene glycol as hydrotrope, compared with the detergent with 0.5 PEI ethoxylate, and compared with Dawn commercial detergent. From FIG. 1, critical micelle concentrations (cmc) can be determined as the intercept of 2 straight lines drawn for each curve.

The embodiments of this invention are not limited to particular cleaning applications, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof.

As used herein, the term "free" in reference to a compound refers to a composition, mixture, or ingredient that does not contain said compound, or to which the compound has not been added. Should the compound be present through contamination, the amount of the compound shall be less than 0.5 wt. %. More preferably, the amount of is less than 0.1 wt. %, and most preferably, the amount is less than 0.01 wt. %.

As used herein, the term "flash foam" refers to the foam generated when water and the cleaning composition are first combined and agitated prior to cleaning a surface such as ware.

As used herein, the term "foam stability" refers to the relative ability of a foam to withstand gradual loss through exposure to soils.

The term "generally recognized as safe" or "GRAS," as used herein refers to components classified by the Food and Drug Administration as safe for direct human food consumption or as an ingredient based upon current good manufacturing practice conditions of use, as defined for example in 21 C.F.R. Chapter 1, § 170.38 and/or 570.38.

As used herein, the term "hard water" refers to water when it includes at least at least 15 grains (255 ppm) hardness, at least 17 grains (289 ppm) hardness, or at least 20 grains (340) hardness. 1 grain hardness is equal to about 17 ppm.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Compositions

The present invention relates to liquid and solid concentrated compositions, diluted ready-to-use composition, use solutions, and methods of using the compositions to remove soils from surfaces. In an aspect of the invention, the compositions can be prepared in the form of a soaking composition. In addition to loosening greasy, baked on soils, the compositions can also protect the surface of the ware both while soaking in the compositions and while passing through a dishmachine. The compositions can be applied by soaking ware in a solution made from the compositions, which is used to loosen grease and food soils on ware, such as pots and pans, before the pots and pans are run through a dishmachine. The soaking step reduces the number of washes soiled ware must undergo to remove the soils when compared to not using a soaking composition, soaking with water, or soaking with a manual detergent. The soaking composition can be used on ware made of various materials, including, for example: stainless steel, aluminum, and plastics. A particularly suitable application for the soaking composition is removing grease and organic soils from pots and pans.

The soaking composition loosens grease and soil from the surface such that the soil is substantially removed from the surface when the ware is passed through a single cycle of a dishmachine. In addition, no personal protective equipment is needed when the soaking composition is used at the recommended concentration and with the recommended procedures.

The soaking composition provides metal protection for metal ware and prevents discoloration when soaked in the soaking composition for extended soak times at the recommended detergent concentration. Ware immersed in the soaking composition can soak overnight with minimal to no discoloration. For example, Aluminum 3003 and 6061 can be soaked in the soaking solution for extended soak times at the recommended detergent concentration without causing noticeable blackening or discoloration.

Typically, when ware is soaked in a solution and then removed and placed into a dishmachine, a small quantity of the soaking solution is carried with the ware. Because the soaking composition is used prior to placing the ware in a dishmachine for cleaning, components in the soaking composition may produce foam. The soaking composition is formulated to produce lower foam than typical pot and pan detergents when agitated. This lower foaming property allows the soaking composition to be used in combination with a dishmachine without excessive carryover.

The cleaning compositions can be dispensed from a liquid dispenser, including for example the dispensers described in U.S. Pat. No. 5,816,446 to Steindorf, et al., which is assigned to Ecolab Inc. of Saint Paul, Minn., the assignee of this application, and incorporated as if set forth fully herein.

Preferably, the cleaning compositions provide good flash foam properties. In certain embodiments, the flash foam properties are improved over those of existing cleaning compositions and methods of cleaning. Further, preferred embodiments of the cleaning compositions provide good foam stability. In certain embodiments, the foam stability is improved over those of existing cleaning compositions and methods of cleaning.

In some embodiments, the cleaning compositions are GRAS. In some embodiments, the cleaning compositions are substantially free of phosphorus.

Surfactant System

The cleaning compositions of the present invention include a high foaming detergent surfactant system in combination with an alcohol booster. The surfactant and booster can be used as a pre-soak or as a component in a traditional high foaming detergent. The surfactant system comprises one or more surfactants one of which is a high foaming anionic surfactant such as a sultaine, and a linear medium chain (C6, C7, C8, C9, C10, C11, and or C12) alcohol booster. The ratio of the medium chain linear alcohol to the total anionic surfactant can be as low as 1 to 100 up to a maximum of 2 to 100.

Additional surfactants can be present in the surfactant system and/or in the cleaning compositions. Other surfactants suitable for the use in the surfactant system include nonionic surfactants, cationic surfactants, anionic surfactants, and/or amphoteric/zwitteronic surfactants.

In some embodiments, the concentrated cleaning compositions of the present invention include about 30 wt. % to about 65 wt. % of a surfactant system, preferably about 40 wt. % to about 55 wt. % of a surfactant system, and more preferably about 45 wt. % to about 50 wt. % of a surfactant system.

In some embodiments, the ready-to-use liquid cleaning compositions of the present invention include about 0.5 wt. % to about 5 wt. % of a surfactant system, preferably about 0.7 wt. % to about 4 wt. % of a surfactant system, and more preferably about 0.9 wt. % to about 3 wt. % of a surfactant system.

Anionic Surfactants

The surfactant systems include one or more high foaming anionic surfactants. Anionic surfactants are surface active molecules that include a charge on the hydrophile that is negative; or surfactants in which the hydrophilic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the C5-C17 acyl-N-(C1-C4 alkyl) and —N-(C1-C2 hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents. Preferred alkyl sulfonates are alkyl aryl sulfonates, including, but not limited to, linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate, cumene sulfonate, and sodium toluene sulfonate.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R\ O\ (CH2CH2O)n(CH2)m\ CO2X \quad (3)$$

in which R is a C8 to C22 alkyl group or, in which R1 is a C4-C16 alkyl group; n is an integer of 1-20; m is an integer of 1-3; and X is a counter ion, such as hydrogen, sodium, potassium, lithium, ammonium, or an amine salt such as monoethanolamine or triethanolamine. In some embodiments, n is an integer of 4 to 10 and m is 1. In some embodiments, R is a C8-C16 alkyl group. In some embodiments, R is a C12-C14 alkyl group, n is 4, and m is 1.

In other embodiments, R is and R1 is a C6-C12 alkyl group. In still yet other embodiments, R1 is a C9 alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a C12-13 alkyl polyethoxy (4) carboxylic acid (Shell Chemical), and Emcol CNP-110, a C9 alkylaryl polyethoxy (10) carboxylic acid (Witco Chemical). Carboxylates are also available from Clariant, e.g. the product Sandopan® DTC, a C13 alkyl polyethoxy (7) carboxylic acid.

The concentrated cleaning compositions include from about 20 wt. % to about 50 wt. % of an anionic surfactant, preferably from about 25 wt. % to about 45 wt. % of an anionic surfactant, more preferably from about 30 wt. % to about 40 wt. % of an anionic surfactant.

The ready-to-use liquid cleaning compositions include from about 0.5 wt. % to about 4 wt. % of an anionic surfactant, preferably from about 1 wt. % to about 3.5 wt. % of an anionic surfactant, more preferably from about 2 wt. % to about 3 wt. % of an anionic surfactant.

Medium Chain Alcohol Booster

The booster includes a very low amount of a medium to long chain (C6, C7, C8, C9, C10, C11 or C12) linear alcohol in combination with a high foaming anionic surfactant. The booster typically comprises a ratio of alcohol to anionic surfactant of from about 1 to 100 to about 2 to 100 in the detergent composition. In some embodiments the composition is essentially free of non-linear alcohols, or longer or shorter chain alcohols. Should these compounds be present, for example through contamination, the level of the same shall be less than 0.5 wt. %, may be less than 0.1 wt. %, and often less than 0.01 wt %.

Detergents Comprising the Surfactant System and Booster

Divalent Ion

The compositions of the invention can contain a divalent ion. Preferred divalent ions are calcium and magnesium ions. The divalent ion can be in salt form. Suitable divalent ion salts include, for example, chloride, hydroxide, oxide, formate, acetate, and/or nitrate salts.

In the concentrated cleaning compositions, the divalent ion is present in an amount of from about 0 wt. % to about 8 wt. %, preferably from 0 wt. % to about 5 wt. %, more preferably from about 0 wt. % to about 2 wt. %.

In the ready-to-use cleaning compositions, the divalent ion is present in an amount of from about 0.01 wt. % to about 0.8 wt. %, preferably from 0.05 wt. % to about 0.5 wt. %, more preferably from about 0.08 wt. % to about 0.2 wt. %.

Humectant/Hydrotrope

The cleaning compositions include one or more humectants. Suitable humectants include, but are not limited to, glycerol, hexylene glycol, propylene glycol, and dipropylene glycol. In certain embodiments the compositions also include hexylene glycol as a hydrotrope and in certain embodiments the composition is essentially free of propylene glycol The humectant is present in the concentrated cleaning compositions in an amount of from about 4 wt. % to about 30 wt. %, preferably from about 8 wt. % to about 25 wt. %, and more preferably from about 12 wt. % to about 20 wt. %.

The humectant is present in the ready-to-use liquid cleaning compositions in an amount of from about 0.4 wt. % to about 3 wt. %, preferably from about 0.8 wt. % to about 2.5 wt. %, and more preferably from about 1 wt. % to about 2 wt. %.

Coupling Agents

The cleaning compositions include one or more coupling agents. Suitable coupling agents include aromatic sulfonates. Aromatic sulfonates such as the alkyl benzene sulfonates (e.g., xylene sulfonates, toluene sulfonates, or cumene sulfonates) or naphthalene sulfonates, aryl or alkaryl phosphate esters or their alkoxylated analogues having 1 to about 40 ethylene, propylene or butylene oxide units or mixtures thereof are also examples of useful aromatic sulfonates. Preferred aromatic sulfonates include sodium xylene sulfonate, sodium toluene sulfonate, and cumene sulfonate, most preferred is sodium xylene sulfonate.

In the concentrated cleaning compositions, the coupling agent is present in an amount of from about 0.05 wt. % to about 5 wt. %, preferably from about 0.1 wt. % to about 3 wt. % and more preferably from about 0.2 wt. % to about 1 wt. %.

In the ready-to-use liquid cleaning compositions, the coupling agent is present in an amount from about 0.005 wt. % to about 0.5 wt. %, preferably from about 0.01 wt. % to about 0.3 wt. %, and more preferably from about 0.02 wt. % to about 0.1 wt. %.

Preservative

The detergent compositions can optionally include a preservative. Suitable preservatives include, but are not limited to, the antimicrobial classes such as phenolics, quaternary ammonium compounds, metal derivatives, amines, alkanol amines, nitro derivatives, analides, organosulfur and sulfur-nitrogen compounds and miscellaneous compounds. Exemplary phenolic agents include pentachlorophenol, orthophenylphenol. Exemplary quaternary antimicrobial agents include benzalconium chloride, cetylpyridiniumchloride, amine and nitro containing antimicrobial compositions such as hexahydro-1,3,5-tris(2-hydroxyethyl)-s-triazine, dithiocarbamates such as sodium dimethyldithiocarbamate, and a variety of other materials known in the art for their microbial properties. Other exemplary preservatives include gluteraldehyde, Bronopol, silver, and isothiazolones such as methylisothiazolinone. Preferred preservatives include those sold under the tradename Neolone™.

If a preservative is included in the compositions, it is preferably in an amount between about 0.01 wt. % and about 10 wt. %.

Additional Surfactants

The surfactant system often includes additional surfactants in combination with the anionic high forming surfactants. These can include one or more of the following:

Semi-Polar Nonionic Surfactants

The surfactant system can also include a semi-polar type of nonionic surfactant. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives. Preferred semi-polar surfactants are amine oxides.

Amine oxides are tertiary amine oxides corresponding to the general formula:

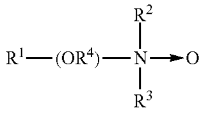

wherein the arrow is a conventional representation of a semi-polar bond; and R1, R2, and R3 may be aliphatic, aromatic, heterocyclic, alicyclic, or combinations thereof. Generally, for amine oxides of detergent interest, R1 is an alkyl radical of from 8 to 24 carbon atoms; R2 and R3 are alkyl or hydroxyalkyl of 1-3 carbon atoms or a mixture thereof; R2 and R3 can be attached to each other, e.g. through an oxygen or nitrogen atom, to form a ring structure; R4 is an alkaline or a hydroxyalkylene group containing 2 to 3 carbon atoms; and n ranges from 0 to 20.

Useful water soluble amine oxide surfactants are selected from the coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-h-ydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water-soluble phosphine oxides having the following structure:

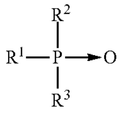

wherein the arrow is a conventional representation of a semi-polar bond; and R1 is an alkyl, alkenyl or hydroxyalkyl moiety ranging from 10 to 24 carbon atoms in chain length; and R2 and R3 are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphine oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water-soluble sulfoxide compounds which have the structure:

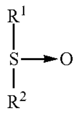

wherein the arrow is a conventional representation of a semi-polar bond; and, R1 is an alkyl or hydroxyalkyl moiety of 8 to 28 carbon atoms, from 0 to 5 ether linkages and from 0 to 2 hydroxyl substituents; and R2 is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

While not wishing to be bound by the theory it is believed that use of the semi-polar nonionic surfactant in the compositions provides clarity to the liquid compositions, including, the ready-to-use composition. Without use of the semi-polar nonionic surfactant, the ready-to-use composition was cloudy. Surprisingly, when the semi-polar nonionic was added to the compositions, the liquid compositions maintained clarity.

The concentrated cleaning compositions include from about 1 wt. % to about 40 wt. % semi-polar nonionic surfactant, preferably from about 5 wt. % to about 35 wt. % semi-polar nonionic surfactant, more preferably from about 10 wt. % to about 30 wt. % semi-polar nonionic surfactant.

The ready-to-use liquid cleaning compositions include from about 0.05 wt. % to about 2.5 wt. % semi-polar nonionic surfactant, preferably from about 0.1 wt. % to about 2 wt. % semi-polar nonionic surfactant, more preferably from about 0.4 wt. % to about 1.5 wt. % semi-polar nonionic surfactant.

In addition, without being limited according to the invention, all ranges recited are inclusive of the numbers defining the range and include each integer within the defined range. In a further aspect, the cleaning compositions are suitable for use in hard water (e.g., 17 or 20 grain water hardness), in particular, in providing good foaming.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Solvay and Triton® manufactured by Dow Chemical.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Sasol.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

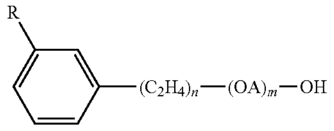

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n$ $(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n$ $(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n$ $(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: $R_1$ is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}-(PO)_SN-(EO)_tH$, $R^{20}-(PO)_SN-(EO)_tH(EO)_tH$, and $R^{20}-N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}-(PO)_V-N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

In a preferred embodiment the compositions include a non-ionic surfactant of a linear alcohol ethoxylate nonionic surfactant. As used herein, the linear alcohol ethoxylate is preferably a fatty alcohol ethoxylate.

The ethoxylated C6-C18 fatty alcohols and C6-C18 mixed ethoxylated and propoxylated fatty alcohols are suitable surfactants for use in the present compositions. Suitable ethoxylated fatty alcohols include the C6-C18 ethoxylated fatty alcohols with a degree of ethoxylation from at least about 3 to 50. Particularly suitable ethoxylated fatty alcohols include C6-C18, preferably C10-C18, preferably C12-C14, which may vary depending upon either the organic or synthetic source of the ethoxylated fatty alcohols.

Suitable ethoxylated fatty alcohols further include a degree of ethoxylation from at least about 3 or greater, preferably at least about 4 or greater. Preferably the degree of ethoxylation of the ethoxylated fatty alcohols according to the invention is from between 3 to 20, more preferably between about 5 and 12, most preferably about 9. In addition, without being limited according to the invention, all ranges of the degree of ethoxylation recited are inclusive of the numbers defining the range and include each integer within the defined range. For example, commercially available ethoxylated C13-C15 fatty alcohols have a degree of ethoxylation of 7 (e.g. 7 moles of EO) and has a predominately unbranched C13-C15 oxo alcohol having approximately 67% C13 and approximately 33% C15. As one skilled in the art appreciates, additional synthetic and organic ethoxylated fatty alcohols are available and included within the scope of the present invention. Particularly suitable linear alcohol ethoxylates include those sold under the trade name Surfonic L™ series by Huntsman Chemicals.

14. Extended surfactants are an useful class of surfactant, the general formula for a nonionic extended surfactant is R-$[L]_x$-$[O—CH_2—CH_2]_y$, where R is the lipophilic moiety, a linear or branched, saturated or unsaturated, substituted or unsubstituted, aliphatic or aromatic hydrocarbon radical having from about 8 to 20 carbon atoms, L is a linking group, or hydrophobe such as a block of poly-propylene oxide, a block of poly-ethylene oxide, a block of poly-butylene oxide or a mixture thereof; x is the chain length of the linking group ranging from 1-25; and y is the average degree of ethoxylation ranging from 1-20.

Anionic extended surfactants generally have the formula:

$$R\text{-}[L]_x—[O—CH_2—CH_2]_y\text{-}M$$

Where R is the lipophilic moiety, a linear or branched, saturated or unsaturated, substituted or unsubstituted, aliphatic or aromatic hydrocarbon radical having from about 8 to 20 carbon atoms, L is a linking group, or hydrophobe such as a block of poly-propylene oxide, a block of poly-ethylene oxide, a block of poly-butylene oxide or a mixture thereof; x is the chain length of the linking group ranging from 1-25; and y is the average degree of ethoxylation ranging from 0-20. Where M is any ionic species such as carboxylates, sulfonates, sulfates, and phosphates. A cationic species will generally also be present for charge neutrality such as hydrogen, an alkali metal, alkaline earth metal, ammonium and ammonium ions which may be substituted with one or more organic groups.

The concentrated cleaning compositions include from about 0.01 wt. % to about 30 wt. % nonionic surfactant, preferably from about 0.05 wt. % to about 25 wt. % nonionic surfactant, more preferably from about 0.01 wt. % to about 20 wt. % nonionic surfactant.

The ready-to-use liquid cleaning compositions include from about 0.01 wt. % to about 1.5 wt. % nonionic surfactant, preferably from about 0.05 wt. % to about 1 wt. % nonionic surfactant, more preferably from about 0.1 wt. % to about 0.7 wt. % nonionic surfactant.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong" inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

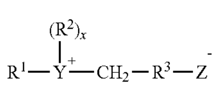

wherein R1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; R2 is an alkyl or monohydroxy alkyl group containing 1 to 3 carbon atoms; x is 1 when Y is a sulfur atom and 2 when Y is a nitrogen or phosphorus atom, R3 is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphoniol-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl) ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

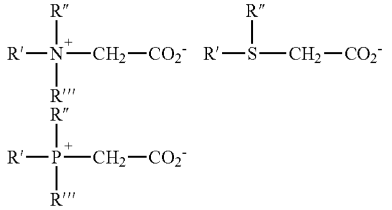

These surfactant betaines typically do not exhibit strong cationic or anionic characters at pH extremes nor do they show reduced water solubility in their isoelectric range.

Unlike "external" quaternary ammonium salts, betaines are compatible with anionics. Examples of suitable betaines include coconut acylamidopropyldimethyl betaine; hexadecyl dimethyl betaine; C12-14 acylamidopropylbetaine; C8-14 acylamidohexyldiethyl betaine; 4-C14-16 acylmethylamidodiethylammonio-1-carboxybutane; C16-18 acylamidodimethylbetaine; C12-16 acylamidopentanediethylbetaine; and C12-16 acylmethylamidodimethylbetaine.

Sultaines useful in the present invention include those compounds having the formula (R(R1)2 N+R2SO3-, in which R is a C6-C18 hydrocarbyl group, each R1 is typically independently C1-C3 alkyl, e.g. methyl, and R2 is a C1-C6 hydrocarbyl group, e.g. a C1-C3 alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

The concentrated cleaning compositions include from about 0.5 wt. % to about 25 wt. % of a sultaine, preferably from about 1 wt. % to about 18 wt. % of a zwitteronic surfactant, more preferably from about 4.5 wt. % to about 11 wt. % of a zwitteronic surfactant.

The ready-to-use liquid cleaning compositions include from about 0.05 wt. % to about 2.5 wt. % of a zwitteronic surfactant, preferably from about 0.1 wt. % to about 2 wt. % of a zwitteronic surfactant, more preferably from about 0.5 wt. % to about 1 wt. % of a zwitteronic surfactant.

Cationic Surfactants

Surface active substances are classified as cationic if the charge on the hydrophilic portion of the molecule is positive and these may also find use in some embodiments. Surfactants in which the hydrophile carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

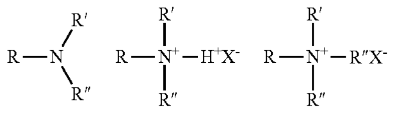

in which, R represents an alkyl chain, R', R", and R'" may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

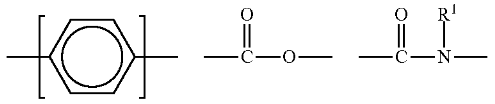

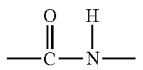

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

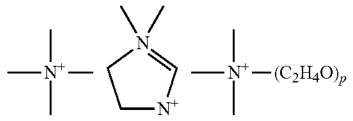

p = about 1 to 12

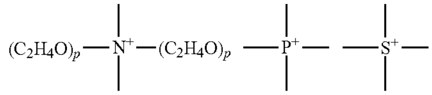

p = about 1 to 12

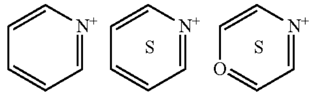

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water-soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Suitable cationic surfactants also include quaternized sugar-derived surfactants. Quaternized sugar-derived surfactants can be preferred in certain embodiments as they are considered mild and suitable for dermal contact.

The quaternized sugar-derived surfactant is a quaternized alkyl polyglucoside or a polyquaternized alkyl polyglucoside, and the like. The poly quaternary functionalized alkyl polyglucoside is a cationic surfactant naturally derived from alkyl polyglucosides and has a sugar backbone. Poly quaternary alkyl polyglucosides have the following representative formula:

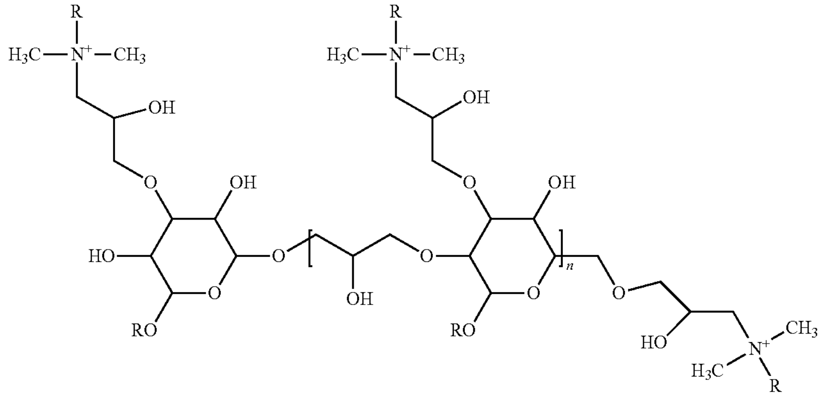

Wherein R is an alkyl group having from about 6 to about 22 carbon atoms and n is an integer ranging from 4 to 6. Examples of suitable poly quaternary functionalized alkyl polyglucosides components which can be used in the cleansing compositions according to the present invention include those in which the R alkyl moiety contains from about 8 to about 12 carbon atoms. In a preferred embodiment the quaternary functionalized alkyl polyglucoside contains primarily about 10-12 carbon atoms. Examples of commercially suitable poly quaternary functionalized alkyl polyglucosides useful in cleansing compositions of the present invention include but is not limited to: Poly Suga®Quat series of quaternary functionalized alkyl polyglucosides, available from Colonial Chemical, Inc., located in South Pittsburgh, Tenn.

In another embodiment, the present invention may also include a quaternary functionalized alkyl polyglucoside. The quaternary functionalized alkyl polyglucoside is a naturally derived cationic surfactant from alkyl polyglucosides and has a sugar backbone. Quaternary functionalized alkyl polyglucosides have the following representative formula:

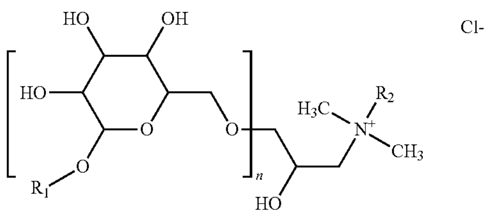

Wherein R1 is an alkyl group having from about 6 to about 22 carbon atoms, and R2 is $CH_3(CH2)_n'$ where n' is an integer ranging from 0-21. Examples of suitable quaternary functionalized alkyl polyglucosides components which can be used in the cleansing compositions according to the present invention include those in which the $R_1$ alkyl moiety contains primarily about 10-12 carbon atoms, the R2 group is CH3 and n is the degree of polymerization of 1-2. Examples of commercially suitable quaternary functionalized alkyl polyglucosides useful in cleansing compositions of the present invention include but is not limited to: Suga®Quat™ 1212 (primarily C12 quaternary functionalized alkyl polyglucoside), Suga®Quat L 1210 (primarily C12 quaternary functionalized alkyl polyglucoside), and Suga®Quat S 1218 (primarily C12 quaternary functionalized alkyl polyglucoside) available from Colonial Chemical, Inc., located in South Pittsburgh, Tenn.

Amphoteric Surfactants

Amphoteric, or ampholytic, surfactants contain both a basic and an acidic hydrophilic group and an organic hydrophobic group and may be used according to certain embodiments. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

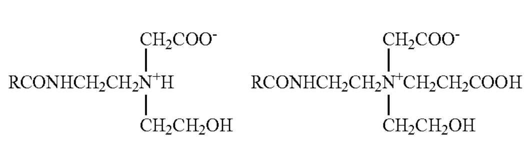

(MONO)ACETATE (DI)PROPINATE

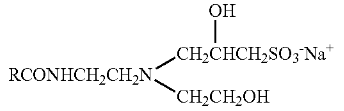

Neutral pH Zwitterion
AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$-$CH_2$-$N^+(CH_2$—$CH_2$—$CO_2Na)_2$—$CH_2$—$CH_2$—OH or $C_{12}$-alkyl-C(O)—N(H)—$CH_2$—$CH_2$—$N^+(CH_2$—$CO_2Na)_2$—$CH_2$—$CH_2$—OH. Disodium cocoampho dipropionate is one suitable amphoteric surfactant and is commercially available under the tradename Miranol™ FBS from Solvay, Cranbury, N.J. Another suitable coconut derived amphoteric surfactant with the chemical name disodium cocoampho diacetate is sold under the tradename Mirataine™ JCHA, also from Rhodia Inc., Cranbury, N.J.

Preferred amphoteric surfactants include alkylamido alkyl amines of structure $RCONHCH_2CH_2NYCH_2CH_2OX$ where R is and alkyl group of about 10 to 18 carbon atoms, Y is $CH_2COOM$, $CH_2CH_2COOM$, $CH_2CHOHCH_2SO_3M$ or $CH_2CHOHCH_2OPO_3M$, X is a hydrogen or $CH_2COOM$ where M is a water soluble cation most preferably $Na^+$, $K^+$, $NH_4^+$, TEA and betaines with the structure $RN^+(C_3)_2$ CHCOO— where R is an alkyl group from about 10 to 18 carbons or an amidopropyl alkyl group where R is from about 10 to about 18 carbons. A preferred alkylamido alkyl amine is disodium cocopamphodipropianate sold as Miranol® C2M SF by Solvay.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Additional Ingredients

The components of the cleaning compositions can further be combined with various functional components suitable for use in ware wash applications. In some embodiments, the cleaning composition including the one or more coupling agents, divalent ion, humectant, and surfactant system make up a large amount, or even substantially all of the total weight of the concentrated cleaning composition. For example, in some embodiments few or no additional functional ingredients are disposed therein.

In other embodiments, additional ingredients may be included in the compositions. The additional ingredients provide desired properties and functionalities to the compositions. Some examples of additional ingredients are discussed in more detail below, although the particular materials discussed are given by way of example only, and that a broad variety of other additional ingredients may be used. For example, many of the additional ingredients discussed below relate to materials used in cleaning, specifically ware wash applications. However, other embodiments may include additional ingredients for use in other applications.

In preferred embodiments, the compositions do not include DEA. In preferred embodiments, the compositions do not include phosphorus.

In other embodiments, the compositions may include alkaline sources, anti-redeposition agents, bleaching agents, chelating/sequestering agents, corrosion inhibitors, detergent builders or fillers, dyes and/or odorants, enzymes, enzyme stabilizing systems, neutralizers, pH adjusters, salts, silicates, additional surfactants, and/or thickening agents.

Alkaline Sources

The cleaning compositions can optionally include a minor but effective amount of one or more alkaline sources to neutralize the anionic surfactants and improve soil removal performance of the composition. Accordingly, an alkali metal or alkaline earth metal hydroxide or other hydratable alkaline source, is preferably included in the cleaning composition in an amount effective to neutralize the anionic surfactant. However, it can be appreciated that an alkali metal hydroxide or other alkaline source can assist to a limited extent, in solidification of the composition. Although the amount of alkali metal and alkaline earth metal hydroxide is necessitated to neutralize the anionic surfactant as above described, additional alkaline sources may be present to a point where the pH of an aqueous solution does not exceed 9.

Suitable alkali metal hydroxides include, for example, sodium or potassium hydroxide. Suitable alkaline earth metal hydroxides include, for example, magnesium hydroxide. An alkali or alkaline earth metal hydroxide may be added to the composition in the form of solid beads, dissolved in an aqueous solution, or a combination thereof. Alkali and alkaline earth metal hydroxides are commercially available as a solid in the form of prilled beads having a mix of particle sizes ranging from about 12-100 U.S. mesh, or as an aqueous solution, as for example, as a 50 wt.-% and a 73 wt.-% solution. It is preferred that the alkali or alkaline earth metal hydroxide is added in the form of an aqueous solution, preferably a 50 wt.-% hydroxide solution, to reduce the amount of heat generated in the composition due to hydration of the solid alkali material.

A cleaning composition may include a secondary alkaline source other than an alkali metal hydroxide. Examples of secondary alkaline sources include a metal silicate such as sodium or potassium silicate or metasilicate, a metal carbonate such as sodium or potassium carbonate, bicarbonate or sesquicarbonate, and the like; a metal borate such as sodium or potassium borate, and the like; ethanolamines and amines; and other like alkaline sources. Secondary alkalinity agents are commonly available in either aqueous or powdered form, either of which is useful in formulating the present cleaning compositions.

Anti-Redeposition Agents

The cleaning compositions can optionally include an anti-redeposition agent capable of facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like.

Optionally, the concentrated cleaning composition can include from about 0.5 wt. % to about 10 wt. %, preferably from about 1 wt. % to about 5 wt. % of an anti-redeposition agent. Optionally, the ready-to-use liquid cleaning composition can include from about 0.05 wt. % to about 1 wt. %, preferably from about 0.1 wt. % to about 0.5 wt. % of an anti-redeposition agent.

Bleaching Agents

A bleaching agent can optionally be included in some embodiments of the invention. Suitable bleaching agents can include a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

Optionally, the cleaning compositions include a minor but effective amount of a bleaching agent. The concentrated cleaning compositions can include from about 0.1 wt. % to about 10 wt. %, preferably from about 1 wt. % to about 6 wt. %. The ready-to-use liquid cleaning composition can include from about 0.01 wt. % to about 1 wt. %, preferably from about 0.1 wt. % to about 0.6 wt. %.

Chelating/Sequestering Agent

The cleaning compositions can optionally include a chelating/sequestering agent such as an aminocarboxylic acid, a condensed phosphate, a phosphonate, a polyacrylate, and the like. In general, a chelating agent is a molecule capable of coordinating (i.e., binding) the metal ions commonly found in natural water to prevent the metal ions from interfering with the action of the other detersive ingredients of a cleaning composition. The chelating/sequestering agent can also function as a threshold agent when included in an effective amount. An iminodisuccinate (available commercially from Bayer as IDS™) may be used as a chelating agent.

Useful aminocarboxylic acids include, for example, N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), and the like.

Examples of condensed phosphates useful in the present composition include sodium and potassium orthophosphate, sodium and potassium pyrophosphate, sodium tripolyphosphate, sodium hexametaphosphate, and the like.

The composition may include a phosphonate such as 1-hydroxyethane-1,1-diphosphonic acid and the like.

Polymeric polycarboxylates may also be included in the composition. Those suitable for use as cleaning agents have pendant carboxylate groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Optionally, the concentrated cleaning compositions can include from about 0.1 wt. % to about 5 wt. %, preferably from about 0.5 wt. % to about 3 wt. % of a chelating/sequestering agent. Optionally, the ready-to-use liquid cleaning compositions can include from about 0.01 wt. % to about 0.5 wt. %, preferably from about 0.05 wt. % to about 0.3 wt. %.

Corrosion Inhibitors

A corrosion inhibitor can be optionally included in the liquid clearing compositions in an amount sufficient to provide a use solution that exhibits a rate of corrosion and/or etching of glass that is less than the rate of corrosion and/or etching of glass for an otherwise identical use solution except for the absence of the corrosion inhibitor. It is expected that the use solution will include at least approximately 6 parts per million (ppm) of the corrosion inhibitor to provide desired corrosion inhibition properties. It is expected that larger amounts of corrosion inhibitor can be used in the use solution without deleterious effects. The use solution can include between approximately 6 ppm and approximately 300 ppm of the corrosion inhibitor, and between approximately 20 ppm and approximately 200 ppm of the corrosion inhibitor. Examples of suitable corrosion inhibitors include but are not limited to: a combination of a source of aluminum ion and a source of zinc ion, as well as an alkaline metal silicate or hydrate thereof.

The corrosion inhibitor can refer to the combination of a source of aluminum ion and a source of zinc ion. The source of aluminum ion and the source of zinc ion provide aluminum ion and zinc ion, respectively, when the solid detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof.

Exemplary sources of aluminum ion include but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, and aluminum zinc sulfate. Exemplary sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

Optionally, the concentrated cleaning compositions can include a metal corrosion inhibitor in an amount from about 0.1 wt. % to about 5 wt. %, preferably from about 0.5 wt. % to about 3 wt. % of a corrosion inhibitor. Optionally, the ready-to-use liquid cleaning compositions can include from about 0.01 wt. % to about 0.5 wt. %, preferably from about 0.05 wt. % to about 0.3 wt. % of a corrosion inhibitor.

Detergent Builders or Fillers

The cleaning compositions can optionally include a minor but effective amount of one or more of a detergent filler which does not perform as a cleaning agent per se but cooperates with the cleaning agent to enhance the overall cleaning capacity of the composition. Examples of fillers suitable for use in the present cleaning compositions include sodium sulfate, sodium chloride, starch, sugars, $C_1$-$C_{10}$ alkylene glycols such as propylene glycol, and the like. Inorganic or phosphate-containing detergent builders may include alkali metal, ammonium and alkanolammonium salts of polyphosphates (e.g. tripolyphosphates, pyrophosphates, and glassy polymeric meta-phosphates). Non-phosphate builders may also be used.

Optionally, the concentrated cleaning compositions can include a detergent filler in an amount of from about 1 wt. % to about 20 wt. %, preferably from about 3 wt. % to about 15 wt. %. Optionally, the ready-to-use cleaning compositions can include a detergent filler in an amount of from about 0.1 wt. % to about 2 wt. %, preferably from about 0.3 wt. % to about 1.5 wt. %.

Dyes/Odorants

Optionally, various dyes, odorants including perfumes, and other aesthetic enhancing agents can also be included in the cleaning compositions. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Milliken & Company), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as ClS-jasmine or jasmal, vanillin, and the like.

Enzymes

Optionally, the cleaning compositions can include one or more enzymes, which can provide desirable activity for removal of protein-based, carbohydrate-based, or triglyceride-based stains from substrates; for cleaning, destaining, and sanitizing presoaks, such as presoaks for flatware, cups and bowls, and pots and pans; presoaks for medical and dental instruments; or presoaks for meat cutting equipment; for machine warewashing; for laundry and textile cleaning and destaining; for carpet cleaning and destaining; for cleaning-in-place and destaining-in-place; for cleaning and destaining food processing surfaces and equipment; for drain cleaning; presoaks for cleaning; and the like. Enzymes may act by degrading or altering one or more types of soil residues encountered on a surface or textile thus removing the soil or making the soil more removable by a surfactant or other component of the cleaning composition. Both degradation and alteration of soil residues can improve detergency by reducing the physicochemical forces which bind the soil to the surface or textile being cleaned, i.e. the soil becomes more water soluble. For example, one or more proteases can cleave complex, macromolecular protein structures present in soil residues into simpler short chain molecules which are, of themselves, more readily desorbed from surfaces, solubilized or otherwise more easily removed by detersive solutions containing said proteases.

Suitable enzymes may include a protease, an amylase, a lipase, a gluconase, a cellulase, a peroxidase, or a mixture thereof of any suitable origin, such as vegetable, animal, bacterial, fungal or yeast origin. Selections are influenced by factors such as pH-activity and/or stability optima, thermostability, and stability to active detergents, builders and the like. In this respect bacterial or fungal enzymes may be preferred, such as bacterial amylases and proteases, and fungal cellulases. Preferably the enzyme may be a protease, a lipase, an amylase, or a combination thereof.

Optionally, the concentrated cleaning compositions can include an enzyme in an amount of from about 0.1 wt. % to about 5 wt. %, preferably from about 0.5 wt. % to about 3 wt. % of an enzyme. Optionally, the ready-to-use liquid cleaning compositions can include from about 0.01 wt. % to about 0.5 wt. %, preferably from about 0.05 wt. % to about 0.3 wt. % of an enzyme.

Enzyme Stabilizing System

The cleaning compositions can optionally include an enzyme stabilizing system. The enzyme stabilizing system can include a boric acid salt, such as an alkali metal borate or amine (e. g. an alkanolamine) borate, or an alkali metal borate, or potassium borate. The enzyme stabilizing system can also include other ingredients to stabilize certain enzymes or to enhance or maintain the effect of the boric acid salt.

For example, the cleaning composition of the invention can include a water-soluble source of calcium and/or magnesium ions. Calcium ions are generally more effective than magnesium ions and are preferred herein if only one type of cation is being used. Cleaning and/or stabilized enzyme cleaning compositions, especially liquids, may include 1 to 30, 2 to 20, or 8 to 12 millimoles of calcium ion per liter of finished composition, though variation is possible depending on factors including the multiplicity, type and levels of enzymes incorporated. Water-soluble calcium or magnesium salts may be employed, including for example calcium chloride, calcium hydroxide, calcium formate, calcium malate, calcium maleate, calcium hydroxide and calcium acetate; more generally, calcium sulfate or magnesium salts corresponding to the listed calcium salts may be used. Further increased levels of calcium and/or magnesium may of course be useful, for example for promoting the grease-cutting action of certain types of surfactant.

Stabilizing systems of certain cleaning compositions, for example warewashing stabilized enzyme cleaning compositions, may further include 0 to 10%, or 0.01% to 6% by weight, of chlorine bleach scavengers, added to prevent chlorine bleach species present in many water supplies from attacking and inactivating the enzymes, especially under alkaline conditions. While chlorine levels in water may be small, typically in the range from about 0.5 ppm to about 1.75 ppm, the available chlorine in the total volume of water that comes in contact with the enzyme, for example during warewashing, can be relatively large; accordingly, enzyme stability to chlorine in-use can be problematic.

Suitable chlorine scavenger anions are known and readily available, and, if used, can be salts containing ammonium cations with sulfite, bisulfate, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used.

Neutralizers

The cleaning compositions can optionally include a neutralizer. In an embodiment of the invention employing an anionic surfactant, the neutralizer can be added to neutralize the anionic surfactant. Suitable neutralizers include, but are not limited to, amino alcohols, such as amino-2-methyl-1-propanol (AMP) and triethanolamine (TEA). In an embodiment, amino-2-methyl-1-propanol is the preferred neutralizer (available as AMP 95).

Optionally, the concentrated cleaning compositions can include a neutralizer in an amount from about 0.5 wt. % to about 15 wt. %, preferably from about 1 wt. % to about 12 wt. %, and more preferably from about 5 wt. % to about 10 wt. %. Optionally, the ready-to-use liquid cleaning compositions can include a neutralizer in an amount from about 0.05 wt. % to about 1.5 wt. %, preferably from about 0.1 wt. % to about 1.2 wt. %, and more preferably from about 0.5 wt. % to about 1 wt. %.

Silicate

Optionally, a silicate can be included in the cleaning composition to provide for metal protection but are additionally known to provide alkalinity and additionally function as anti-redeposition agents. Exemplary silicates include but are not limited to: sodium silicate and potassium silicate. The cleaning composition can be provided without a silicate, but when a silicate is included, it can be included in amounts that provide for desired metal protection.

Optionally, the concentrated cleaning composition can include a silicate in an amount of from about 0.1 wt. % to about 5 wt. %, preferably from about 0.5 wt. % to about 3 wt. %. Optionally, the ready-to-use liquid cleaning compositions can include from about 0.01 wt. % to about 0.5 wt. %, preferably from about 0.05 wt. % to about 0.3 wt. % of a silicate.

Thickening Agent

Optionally, the cleaning compositions can include a thickening agent. Some examples of additional thickeners include soluble organic or inorganic thickener material. Some examples of inorganic thickeners include clays, silicates and other well-known inorganic thickeners. Some examples of organic thickeners include thixotropic and non-thixotropic thickeners. In some embodiments, the thickeners have some substantial proportion of water solubility to promote easy removability. Examples of useful soluble organic thickeners for the compositions of the invention comprise carboxylated vinyl polymers such as polyacrylic acids and sodium salts thereof, ethoxylated cellulose, polyacrylamide thickeners, xanthan thickeners, guargum, sodium alginate and algin by-products, hydroxy propyl cellulose, hydroxy ethyl cellulose and other similar aqueous thickeners that have some substantial proportion of water solubility. The thickening agents can be added to provide the desired viscosity.

Embodiments

The cleaning composition can be a liquid or solid concentrate, a ready-to-use composition, or a use solution. In general, a concentrate refers to a composition that is intended to be diluted with water to provide a use solution that contacts an object to provide the desired cleaning, rinsing, or the like. The concentrate can be in liquid or solid form. Further, the concentrate can be diluted to form a ready-to-use composition. The ready-to-use compositions can be contacted with the articles to be cleaned or with water to form a use solution. If the articles are contacted with the ready-to-use composition, water is then added to form the use solution. It should be understood that the concentration of the coupling agents, divalent ion, humectant, surfactant system, and other optional functional ingredients in the cleaning composition will vary depending on whether the cleaning composition is provided as a concentrate or as a use solution.

Exemplary ranges of the cleaning compositions in concentrated form are shown in Table 1 in weight percentage of the compositions.

TABLE 1

Exemplary Concentrated Cleaning Compositions to which the booster may be added.

| Material | First Exemplary Range wt. % | Second Exemplary Range wt. % | Third Exemplary Range wt. % |
|---|---|---|---|
| Coupling Agent | 0.05-5 | 0.1-3 | 0.2-1 |
| Divalent Ion | 0-8 | 0-5 | 0-2 |
| Humectant | 4-30 | 8-25 | 12-20 |
| Anionic surfactant | 20-50 | 25-45 | 30-40 |
| Nonionic surfactant | 0.01-30 | .05-25 | 0.1-20 |
| Semi-polar surfactant | 1-40 | 5-35 | 10-30 |
| Additional Ingredients (including linear short to mid chain alcohol) | 0.01-40 | 0.05-25 | 1-15 |

In an aspect of the invention, the concentrated liquid cleaning compositions have a viscosity of greater than about 200 cps and less than about 400 cps and, preferably greater than about 220 cps and less than about 350 cps, more preferably greater than about 250 cps and less than about 300 cps or less, and even more preferably about 280 cps or less In a further aspect of the invention, the ready-to-use/diluted liquid cleaning compositions have a viscosity of between about 30 cps and 125 cps, more preferably between 50 cps and 100 cps.

In another aspect of the invention, the liquid cleaning compositions have a pH of between about 4 and about 11, more preferably between about 6 and 10, or even more preferably between about 7 and about 9. It should be understood, however, that depending on the desired application and properties more alkaline or more acidic pHs may be desirable. In such instances, pH adjusters may be used to adjust the pH to the desired level.

In still a further aspect of the invention, the liquid cleaning compositions provide flash foam in an amount greater than about 100 mL, preferably about 120 mL or greater, or even more preferably about 130 mL or greater. The liquid cleaning compositions provide stable foam in an amount greater than about 700 mL, preferably about 800 mL or greater, more preferably about 900 mL or greater, and even more preferably about 1000 mL or greater under ambient temperature.

The concentrate can be diluted by about 10% to form a ready-to-use solution. A use solution may be prepared from the concentrate by diluting the concentrate with water at a dilution ratio that provides a use solution having desired cleaning properties. Either the concentrate or ready-to-use solution can be diluted to form a use solution comprising between about 100 ppm and about 2500 ppm, preferably between about 200 ppm and about 1500 ppm, most preferably between about 300 ppm and about 1000 ppm. In a most preferred embodiment, the use solution is about 500 ppm of the cleaning composition. The water that is used to dilute the concentrate to form the use composition can be referred to as water of dilution or a diluent and can vary from one location to another.

Dispensing/Use of the Cleaning Composition

The cleaning compositions can be dispensed as a concentrate, a ready-to-use composition, or as a use solution. The compositions can be applied directly to an article to be cleaned, in a sink, or to water to form a use solution. The use solution can be applied to the article surface during a presoak application, immediately preceding the manual wash application, or during the manual wash application.

Figure 2:
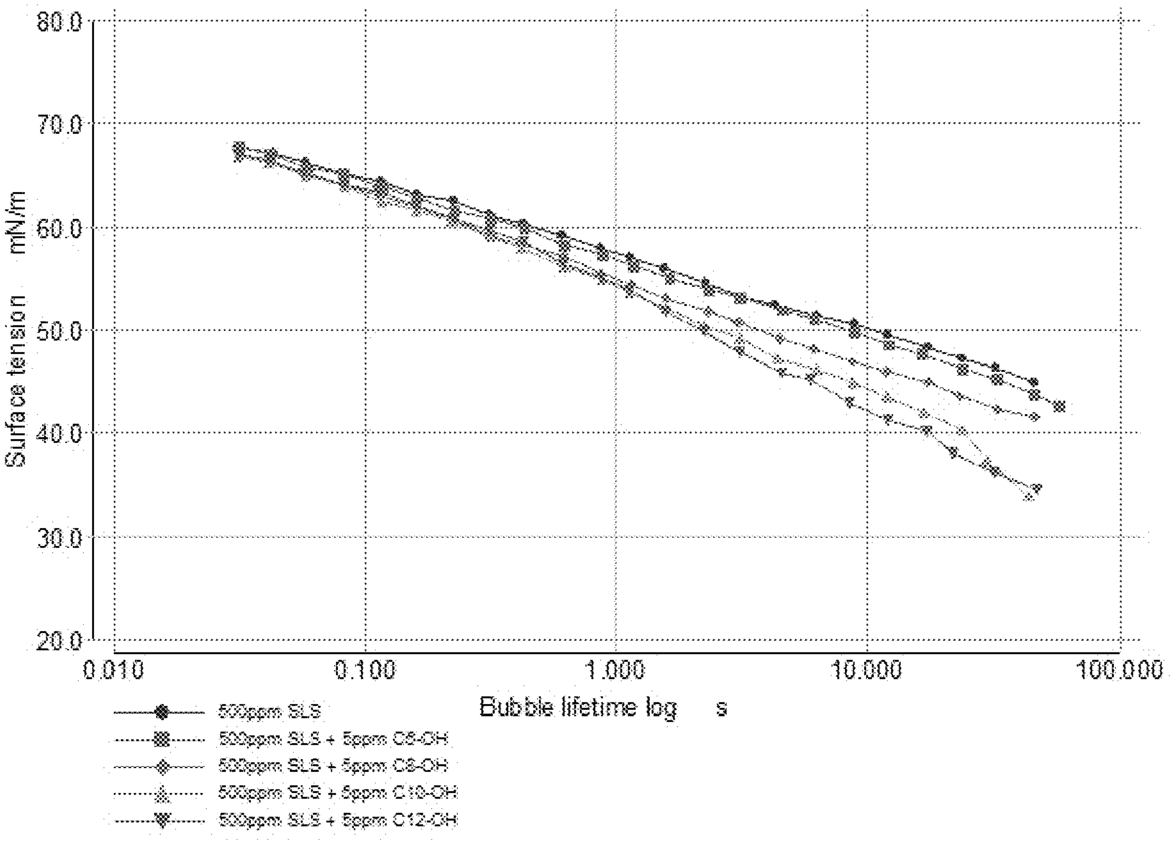
FIG. 2 is a graph of surface tension and bubble lifetime for respective combinations of an anionic surfactant and a medium to long chain linear alcohol (C6-C12 alcohol).
Figure 3:
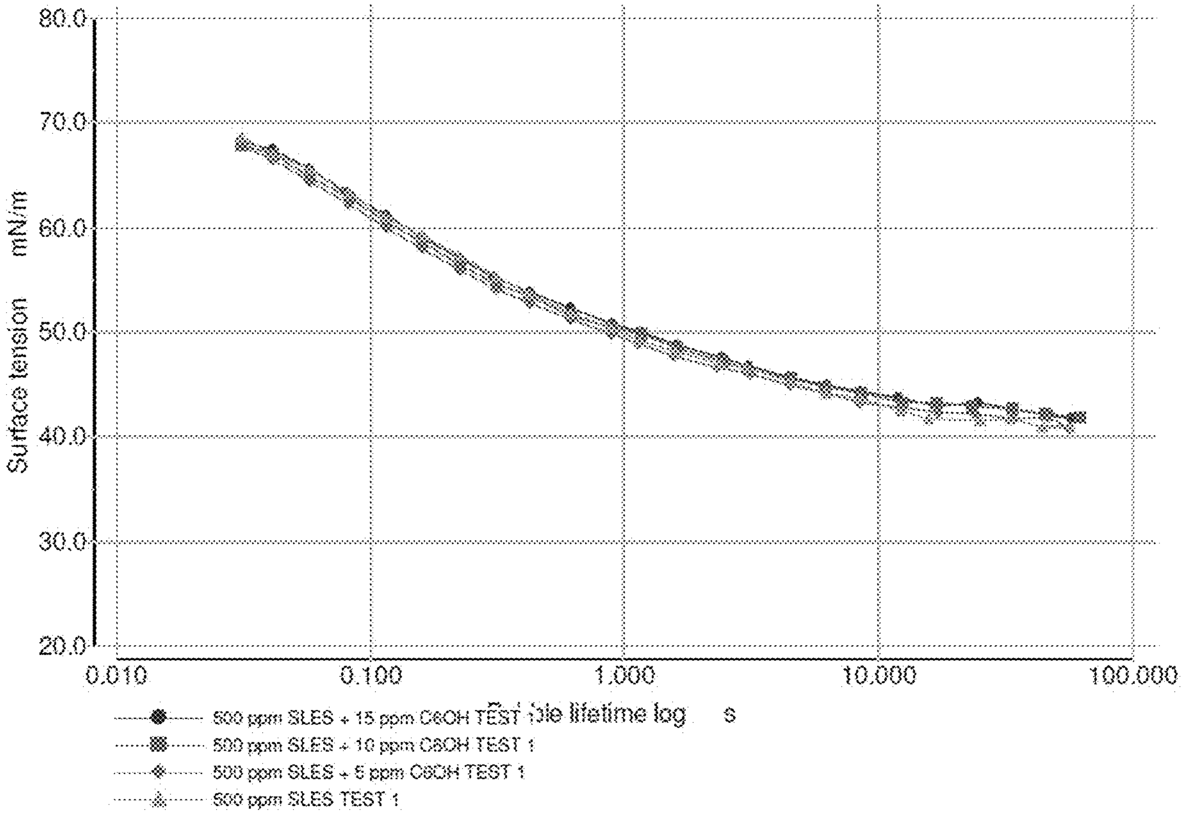
FIG. 3 is a graph of surface tension and bubble lifetime for respective combinations of an anionic surfactant and a medium to long chain linear alcohol (C6-C12 alcohol).
Figure 4:
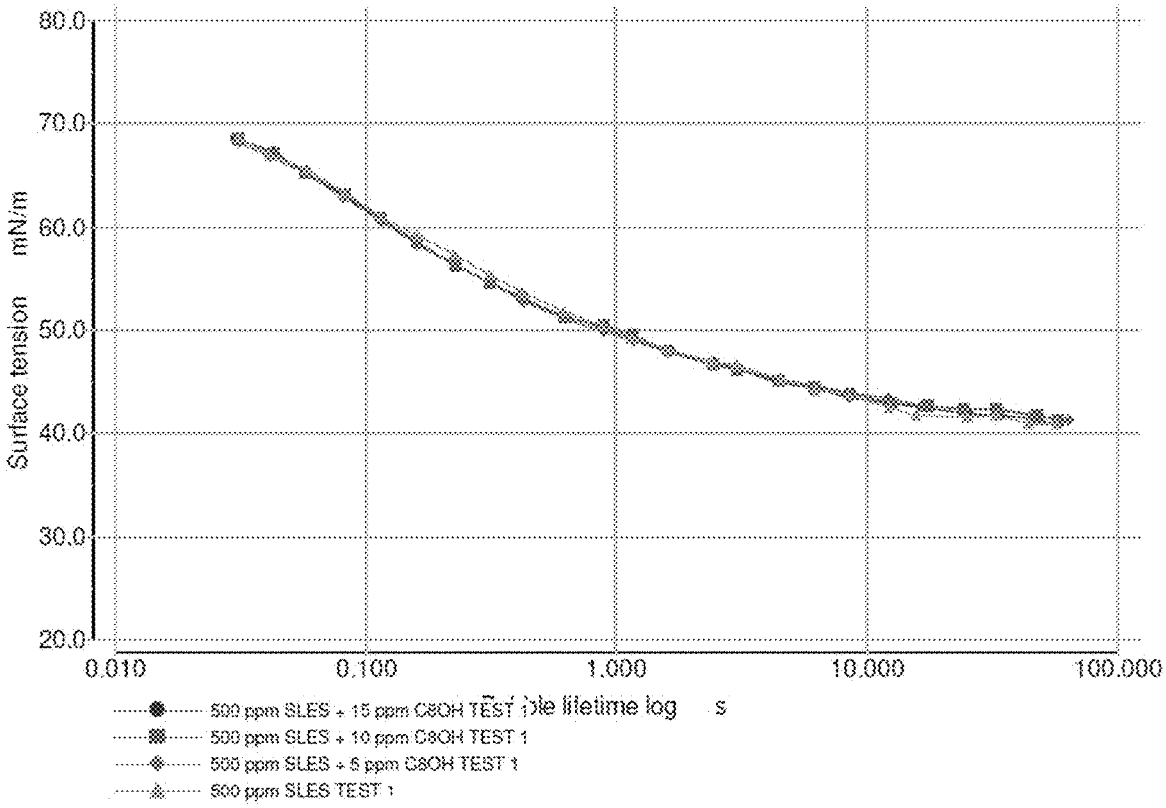
FIG. 4 is a graph of surface tension and bubble lifetime for respective combinations of an anionic surfactant and a medium to long chain linear alcohol (C6-C12 alcohol).
Figure 5:
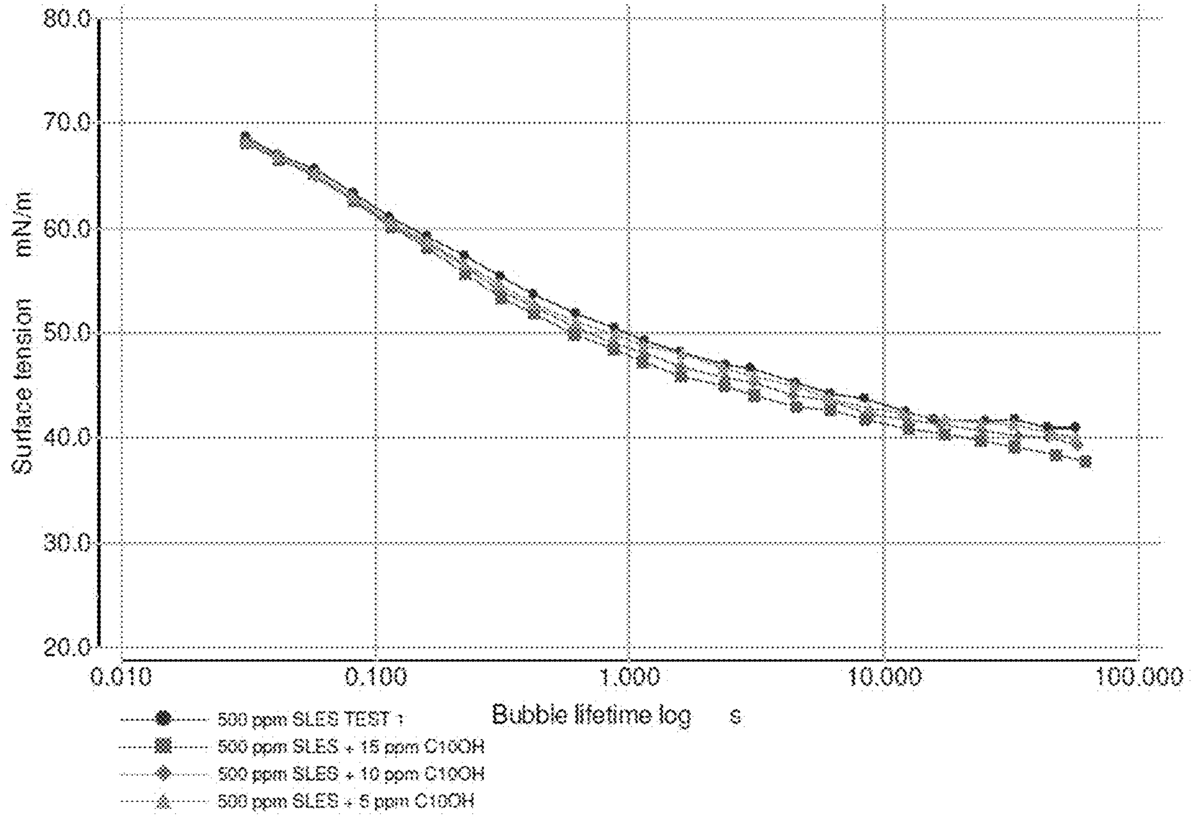
FIG. 5 is a graph of surface tension and bubble lifetime for respective combinations of an anionic surfactant and a medium to long chain linear alcohol (C6-C12 alcohol).
Figure 6:
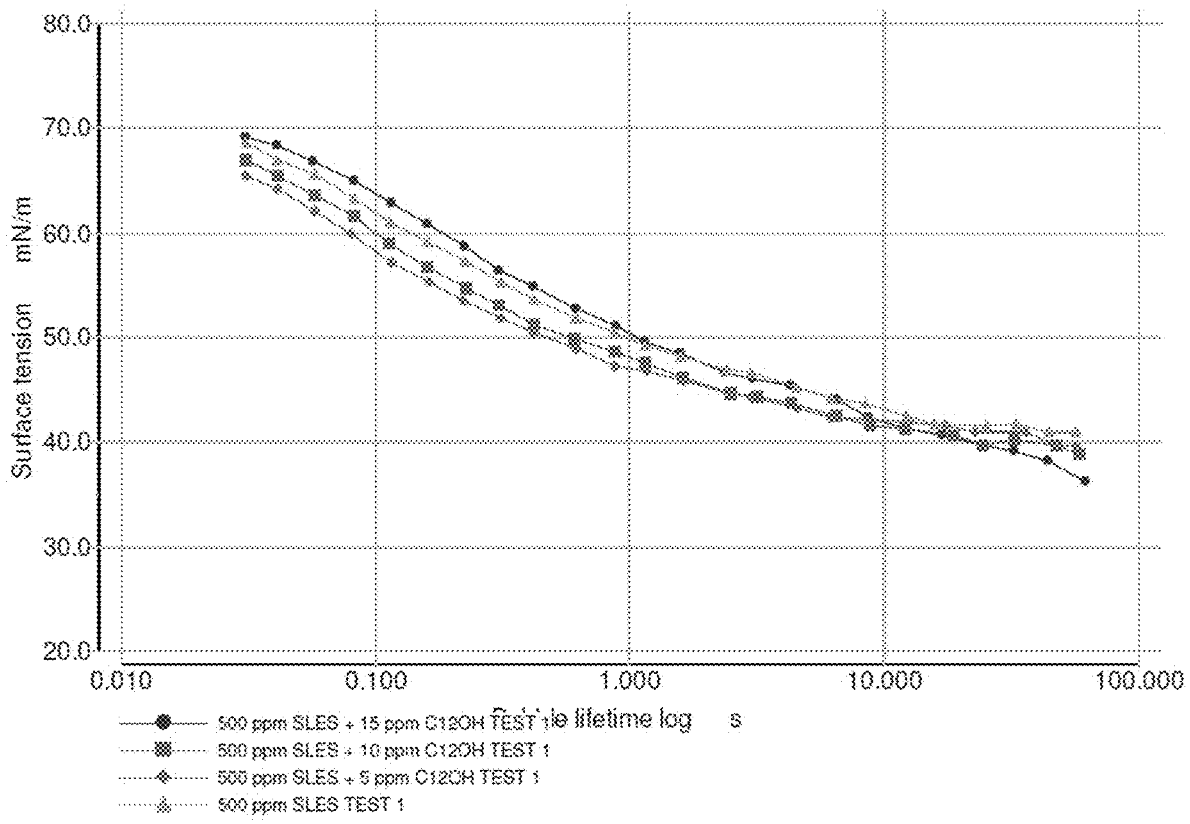
FIG. 6 is a graph of surface tension and bubble lifetime for respective combinations of an anionic surfactant and a medium to long chain linear alcohol (C6-C12 alcohol).
Figure 7:
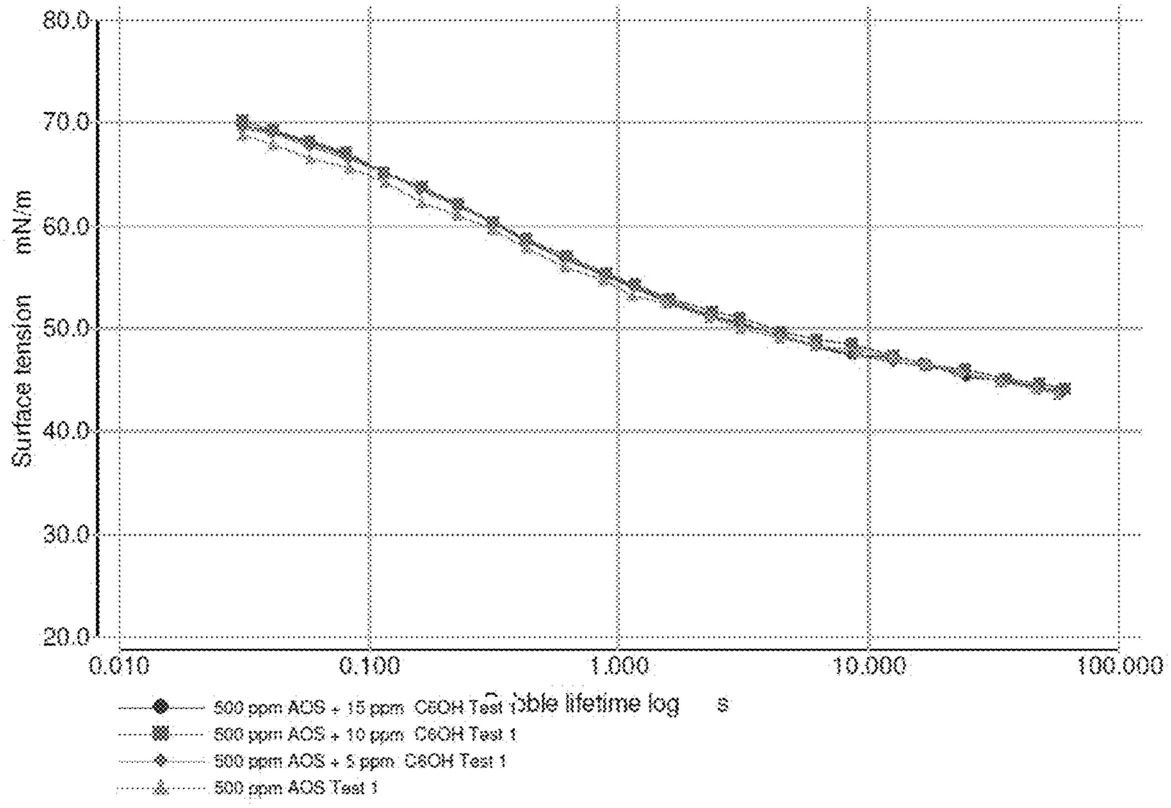
FIG. 7 is a graph of surface tension and bubble lifetime for respective combinations of an anionic surfactant and a medium to long chain linear alcohol (C6-C12 alcohol).
Figure 8:
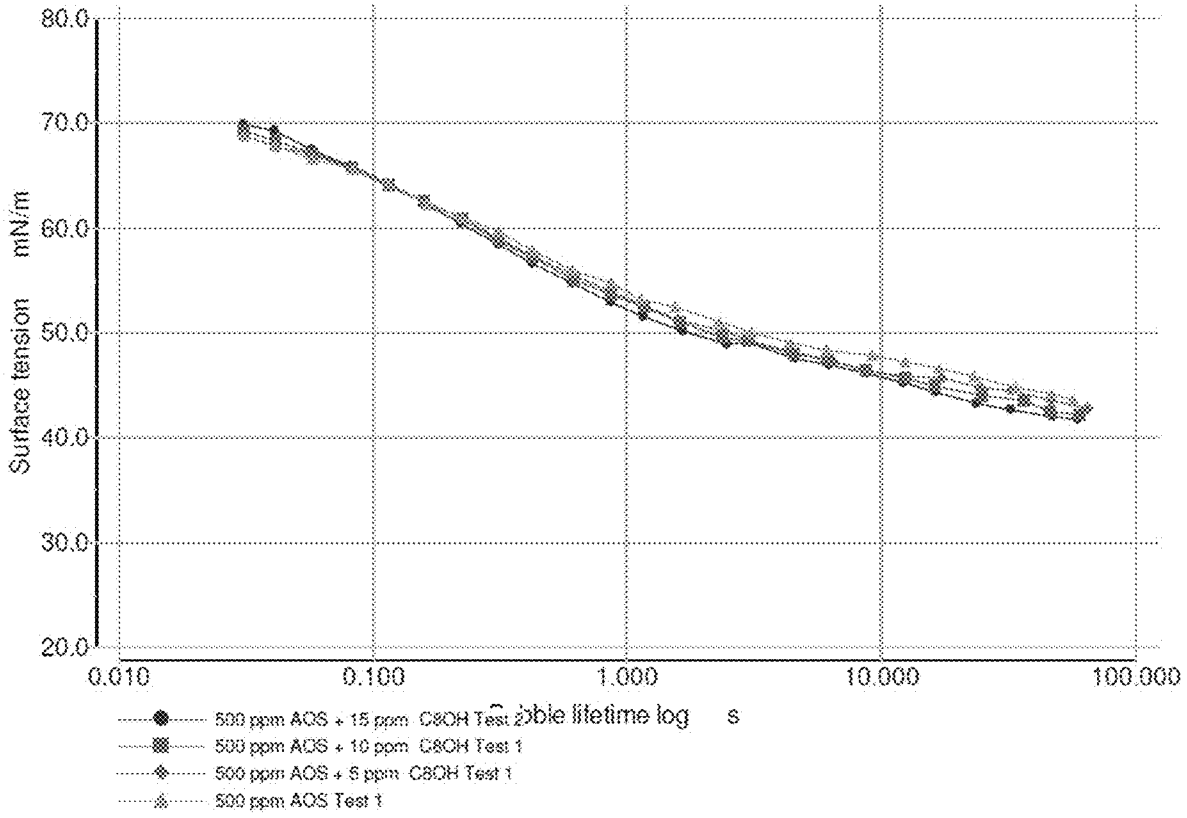
FIG. 8 is a graph of surface tension and bubble lifetime for respective combinations of an anionic surfactant and a medium to long chain linear alcohol (C6-C12 alcohol).
Figure 9:
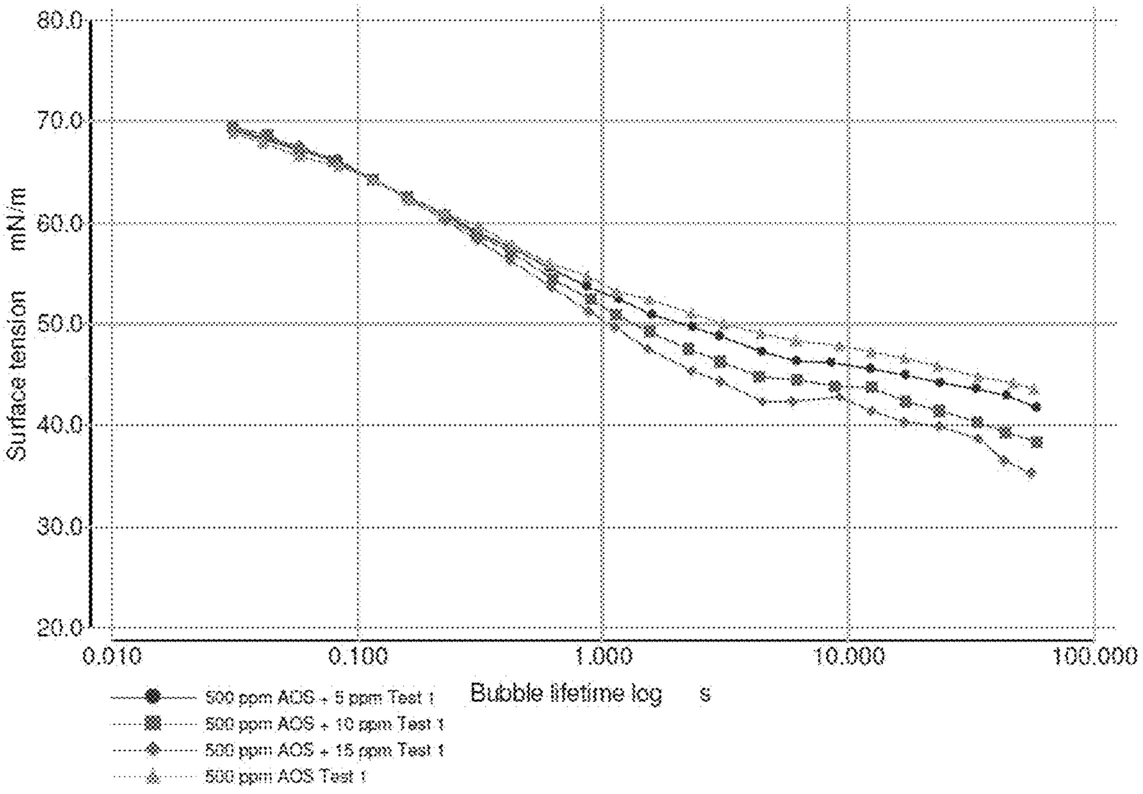
FIG. 9 is a graph of surface tension and bubble lifetime for respective combinations of an anionic surfactant and a medium to long chain linear alcohol (C6-C12 alcohol).
Figure 10:
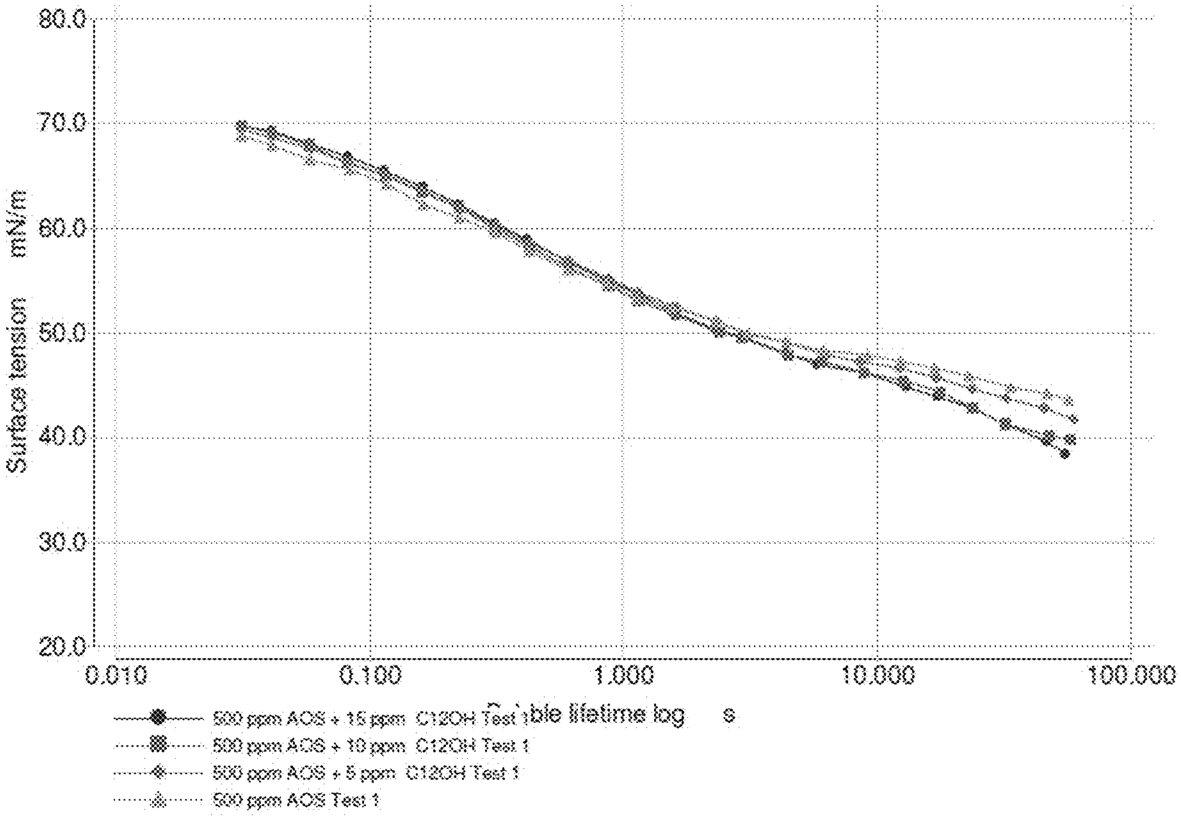
FIG. 10 is a graph of surface tension and bubble lifetime for respective combinations of an anionic surfactant and a medium to long chain linear alcohol (C6-C12 alcohol).

In an aspect of the invention, the compositions form flash foam. The flash foam can be stable for at least 30 seconds, preferably for at least 45 seconds, more preferably for at least about 1 minute. Additionally, the foam is stable in the presence of oil. FIG. 2 demonstrates the stability in presence of corn oil.

The above description provides a basis for understanding the broad meets and bounds of the invention. The following examples and test data provide an understanding of certain specific embodiments of the invention. These examples are not meant to limit the scope of the invention. Unless otherwise noted, all parts, percentages, and ratios reported in the following examples are on a weight basis, and all reagents used in the examples were obtained, or are available, from the chemical suppliers described below, or may be synthesized by conventional techniques.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Examples

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

TABLE 1

Ready to use detergent to which booster is added

| | Commercial detergent |
|---|---|
| Water | 40-50% |
| Divalent ion | 1-5% |
| humectant 40% | 1-5% |
| Anionic surfactant (60%) | 5-15% |
| Anionic surfactant (40%) | 10-30% |
| Semi-polar surfactant 30% | 10-25% |
| Nonionic surfactant | 1-5% |
| Propylene glycol/humectant | 1-5% |
| Other components | 0-5% |
| TOTAL: | 100.00 |

TABLE 2

| Formula | Viscosity | Total Cylinder Foam | Bubble Tensiometer |
|---|---|---|---|
| Commercial detergent | 300-900 (#3, 50 rpm) | 884 | 27.6 |
| Commercial detergent + C10 Alcohol (0.138%) with PG | 1396 (#3, 50 rpm) | 995 | 27 |
| Commercial detergent + C12 Alcohol (0.138%) with PG | 1040 (#3, 50 rpm) | 970 | 25.8 |
| Commercial detergent + C14 Alcohol (0.138%) with PG | 707.2 (#2, 50 rpm) | 915 | 27.4 |
| Commercial detergent + C10 Alcohol (0.138%) with Hex | 212.8 (#2, 50 rpm) | 1113 | 27.8 |
| Commercial detergent + C12 Alcohol (0.138%) with Hex | 266.4 (#2, 50 rpm) | 993 | 27.6 |
| Commercial detergent + C14 Alcohol (0.138%) with Hex | 258.4 (#2, 50 rpm) | 1108 | 28.2 |

TABLE 2-continued

| Formula | Viscosity | Total Cylinder Foam | Bubble Tensiometer |
|---|---|---|---|
| Commercial detergent + C10 Alcohol (0.276%) with PG | 1154 (#3, 50 rpm) | 1073 | 26.5 |
| Commercial detergent + C12 Alcohol (0.276%) with PG | 1148 (#3, 50 rpm) | 1053 | 25.3 |
| Commercial detergent + C14 Alcohol (0.276%) with PG | 906.0 (#3, 50 rpm) | 948 | 26.7 |
| Commercial detergent + C10 Alcohol (0.276%) with Hex | 296.0 (#2, 50 rpm) | 1165 | 27.1 |
| Commercial detergent + C12 Alcohol (0.276%) with Hex | 334.4 (#2, 50 rpm) | 1068 | 26.2 |
| Commercial detergent + C14 Alcohol (0.276%) with Hex | 595.2 (#2, 50 rpm) | 908 | 26.8 |
| Commercial detergent + C12 Alcohol (0.138%) with Hex | 266.4 (#2, 50 rpm) | 993 | 27.6 |
| Commercial detergent + C14 Alcohol (0.138%) with Hex | 258.4 (#2, 50 rpm) | 1108 | 28.2 |

TABLE 2-continued

| Formula | Viscosity | Total Cylinder Foam | Bubble Tensiometer |
|---|---|---|---|
| Commercial detergent + C10 Alcohol (0.276%) with PG | 1154 (#3, 50 rpm) | 1073 | 26.5 |
| Commercial detergent + C12 Alcohol (0.276%) with PG | 1148 (#3, 50 rpm) | 1053 | 25.3 |
| Commercial detergent + C14 Alcohol (0.276%) with PG | 906.0 (#3, 50 rpm) | 948 | 26.7 |
| Commercial detergent + C10 Alcohol (0.276%) with Hex | 296.0 (#2, 50 rpm) | 1165 | 27.1 |
| Commercial detergent + C12 Alcohol (0.276%) with Hex | 334.4 (#2, 50 rpm) | 1068 | 26.2 |
| Commercial detergent + C14 Alcohol (0.276%) with Hex | 595.2 (#2, 50 rpm) | 908 | 26.8 |

The above data in Table 2 demonstrates the benefit of adding one or more medium to long chain linear alcohols to anionic surfactant(s) based compositions are micellar synergies resulting in better surface activities. The complexity of a composition will affect the level of synergy obtained.

Also investigated was adding C10 linear alcohol to a concentrated pot-n-pan platform. Table 3 and 4 summarize the compositions under investigation.

TABLE 3

| RM Name | 10 Hex CC42 1.75X | 10 PG CC42 1.75X | 10 Hex P84 1.75X | 10 PG P84 1.75X | 22 Hex CC42 1.75X | 22 PG CC42 1.75X | 22 Hex P84 1.75X | 22 PG P84 1.75X |
|---|---|---|---|---|---|---|---|---|
| Soft Water | | 11.325 | 12.325 | 12.325 | | | | |
| Other surfactants (nonionic, cationic/semi polar) | 51.5 | 51.5 | 51.5 | 51.5 | 51.5 | 51.5 | 51.5 | 51.5 |
| Anionic surfactant (70%) | 25 | 25 | 25 | 25 | 25 | 25 | 25 | 25 |
| Hexylene Glycol | 10 | | 10 | | 22.325 | | 22.325 | |
| humectant | | 10 | | 10 | | 22.325 | | 22.325 |
| C10 Alcohol | 0.175 | 0.175 | 0.175 | 0.175 | 0.175 | 0.175 | 0.175 | 0.175 |
| Total | 100 | 100 | 100 | 100 | 100 | 100 | 100 | 100 |
| Actives | 43 | 43 | 43 | 43 | 43 | 43 | 43 | 43 |
| Viscosity | Cloudy | Cloudy | 254.4 | 948 | 64.8 | 212 | 104 | 388.8 |
| Total Cylinder Foam | | | 1038 | 1075 | 953 | 793 | | 968 |
| | added 12% SXS and still hazy | Added 1.4% SXS and cleared | | | | | | |

TABLE 4

| RM Name | 10 Hex CC42 1.75X | 10 PG CC42 1.75X | 10 Hex P84 1.75X | 10 PG P84 1.75X | 22 Hex CC42 1.75X | 22 PG CC42 1.75X | 22 Hex P84 1.75X | 22 PG P84 1.75X |
|---|---|---|---|---|---|---|---|---|
| Soft Water | | 11.15 | 12.15 | 12.15 | | | | |
| Nonionic/semi-polar cationic surfactant(s) | 51.5 | 51.5 | 51.5 | 51.5 | 51.5 | 51.5 | 51.5 | 51.5 |
| Anionic surfactant (70%) | 25 | 25 | 25 | 25 | 25 | 25 | 25 | 25 |
| Hexylene Glycol | 10 | | 10 | | 22.15 | | 22.15 | |
| Propylene Glycol | | 10 | | 10 | | 22.15 | | 22.15 |
| C10 Alcohol | 0.35 | 0.35 | 0.35 | 0.35 | 0.35 | 0.35 | 0.35 | 0.35 |
| Total | 100 | 100 | 100 | 100 | 100 | 100 | 100 | 100 |
| Actives | 43 | 43 | 43 | 43 | 43 | 43 | 43 | 43 |
| Viscosity | Cloudy | Cloudy | 231.2 | | | | | |
| Total Cylinder Foam | | | | | | | | |
| | added 12% SXS and still hazy | Added 0.6% SXS and cleared | | | | | | |

Quantifying Synergies Between Single Pairs of an Anionic Surfactant and a Medium to Long Chain Alcohol:

Synergies between respective combinations of an anionic surfactant and a medium to long chain linear alcohol (C6-C12 alcohol) were also quantified. These results are summarized and compared in Tables 5-17 and FIGS. 2-10.

TABLE 5

| | 45 sec bubble lifetime (mN/m) |
|---|---|
| 500 ppm SLS | 44.9 |
| 500 ppm SLS + 5 ppm C6OH | 43.9 |
| 500 ppm SLS + 5 ppm C8OH | 41.6 |
| 500 ppm SLS + 5 ppm C10OH | 34.0 |
| 500 ppm SLS + 5 ppm C12OH | 34.5 |

TABLE 6

| | Test 1 (mN/m) | Test 2 (mN/m) | Ave (mN/m) |
|---|---|---|---|
| 500 ppm SLES | 40.9 | 41.1 | 41.0 |
| 500 ppm SLES + 5 ppm C6OH | 40.8 | 41.7 | 41.3 |
| 500 ppm SLES + 10 ppm C6OH | 41.9 | 41.7 | 41.8 |
| 500 ppm SLES + 15 ppm C6OH | 41.9 | 41.9 | 41.9 |

TABLE 7

| | Test 1 (mN/m) | Test 2 (mN/m) | Ave (mN/m) |
|---|---|---|---|
| 500 ppm SLES | 40.9 | 41.1 | 41.0 |
| 500 ppm SLES + 5 ppm C8OH | 41.2 | 41.7 | 41.5 |
| 500 ppm SLES + 10 ppm C8OH | 41.2 | 41.2 | 41.2 |
| 500 ppm SLES + 15 ppm C8OH | 40.8 | 41.2 | 41.0 |

TABLE 8

| | Test 1 (mN/m) | Test 2 (mN/m) | Ave (mN/m) |
|---|---|---|---|
| 500 ppm SLES | 40.9 | 41.1 | 41.0 |
| 500 ppm SLES + 5 ppm C10OH | 40.0 | 40.4 | 40.2 |
| 500 ppm SLES + 10 ppm C10OH | 39.3 | 39.8 | 39.6 |
| 500 ppm SLES + 15 ppm C10OH | 37.8 | 38.2 | 38.0 |

TABLE 9

| | Test 1 (mN/m) | Test 2 (mN/m) | Ave (mN/m) |
|---|---|---|---|
| 500 ppm SLES | 40.9 | 41.1 | 41.0 |
| 500 ppm SLES + 5 ppm C12OH | 39.6 | 39.3 | 39.5 |
| 500 ppm SLES + 10 ppm C12OH | 38.8 | 38.7 | 38.8 |
| 500 ppm SLES + 15 ppm C12OH | 36.2 | 37.1 | 36.7 |

TABLE 10

| | Test 1 (mN/m) | Test 2 (mN/m) | Ave (mN/m) |
|---|---|---|---|
| 500 ppm AOS | 43.6 | 44.3 | 44.0 |
| 500 ppm AOS + 5 ppm C6OH | 44.0 | 44.1 | 44.1 |
| 500 ppm AOS + 10 ppm C6OH | 44.2 | 43.8 | 44.0 |
| 500 ppm AOS + 15 ppm C6OH | 43.8 | 43.7 | 43.8 |

TABLE 11

| | Test 1 (mN/m) | Test 2 (mN/m) | Ave (mN/m) |
|---|---|---|---|
| 500 ppm AOS | 43.6 | 44.3 | 44.0 |
| 500 ppm AOS + 5 ppm C8OH | 42.8 | 43.2 | 43.0 |
| 500 ppm AOS + 10 ppm C8OH | 42.2 | 42.8 | 42.5 |
| 500 ppm AOS + 15 ppm C8OH | 41.6 | 41.7 | 41.7 |

TABLE 12

| | Test 1 (mN/m) | Test 2 (mN/m) | Ave (mN/m) |
|---|---|---|---|
| 500 ppm AOS | 43.6 | 44.3 | 44.0 |
| 500 ppm AOS + 5 ppm C10OH | 41.8 | 42.3 | 42.0 |
| 500 ppm AOS + 10 ppm C10OH | 38.3 | 38.5 | 38.4 |
| 500 ppm AOS + 15 ppm C10OH | 35.3 | 35.5 | 35.4 |

TABLE 13

| | Test 1 (mN/m) | Test 2 (mN/m) | Ave (mN/m) |
|---|---|---|---|
| 500 ppm AOS | 43.6 | 44.3 | 44.0 |
| 500 ppm AOS + 5 ppm C12OH | 41.8 | 42.4 | 42.1 |
| 500 ppm AOS + 10 ppm C12OH | 39.7 | 39.0 | 39.4 |
| 500 ppm AOS + 15 ppm C12OH | 38.4 | 38.6 | 38.5 |

TABLE 14

Effect of adding low level of C6 alcohol to 500 ppm active anionic surfactant DST (~60 sec. bubble life time)

| 500 ppm active | C6 alcohol added | | | |
|---|---|---|---|---|
| surfactant | 0 ppm | 5 ppm | 10 ppm | 15 ppm |
| AOS | 44.0 | 44.1 | 44.0 | 43.8 |
| SLES | 41.0 | 41.3 | 41.8 | 41.9 |
| SLS (~45 sec) | 44.9 | 43.9 | | |

TABLE 15

Effect of adding low level of C8 alcohol to 500 ppm active anionic surfactant DST (~60 sec. bubble life time)

| 500 ppm active | C8 alcohol added | | | |
|---|---|---|---|---|
| surfactant | 0 ppm | 5 ppm | 10 ppm | 15 ppm |
| AOS | 44.0 | 43.0 | 42.5 | 41.7 |
| SLES | 41.0 | 41.5 | 41.2 | 41.0 |
| SLS (~45 sec) | 44.9 | 41.6 | | |

TABLE 16

Effect of adding low level of C10 alcohol to 500 ppm active anionic surfactant DST (~60 sec. bubble life time)

| 500 ppm active | C10 alcohol added | | | |
|---|---|---|---|---|
| surfactant | 0 ppm | 5 ppm | 10 ppm | 15 ppm |
| AOS | 44.0 | 42.0 | 38.4 | 35.4 |
| SLES | 41.0 | 40.2 | 39.6 | 38.0 |
| SLS (~45 sec) | 44.9 | 34 | | |

TABLE 17

Effect of adding low level of C12 alcohol to 500 ppm active anionic surfactant DST (~60 sec. bubble life time)

| 500 ppm active | C12 alcohol added | | | |
|---|---|---|---|---|
| surfactant | 0 ppm | 5 ppm | 10 ppm | 15 ppm |
| AOS | 44.0 | 42.1 | 39.4 | 38.5 |
| SLES | 41.0 | 39.5 | 38.8 | 36.7 |
| SLS (~45sec) | 44.9 | 34.5 | | |

From the results one can see that the best synergy is between SLS and the linear alcohols, the synergy increases from C6 to C10 and levels off. The next best synergy is between AOS and the linear alcohols, again synergy increases from C8 to C10, and drops slightly with C12.

With SLES, C8 alcohol appears to have a small negative effect, C8 alcohol is neutral, and C10 and C12 alcohols show increasing synergy. The hydrophobic interaction/matching between the carbon chain lengths of the anionic surfactant and the alcohol appears is a major factor. C10 linear alcohol is a liquid, and C12 linear alcohol is a solid. C8 and C6 alcohols, because of their successively lower molecular weights, will have successively higher vapor pressure and thus more odorous. Taking both processing and odor into consideration, C10 linear alcohol is the best choice.

Figure 11:
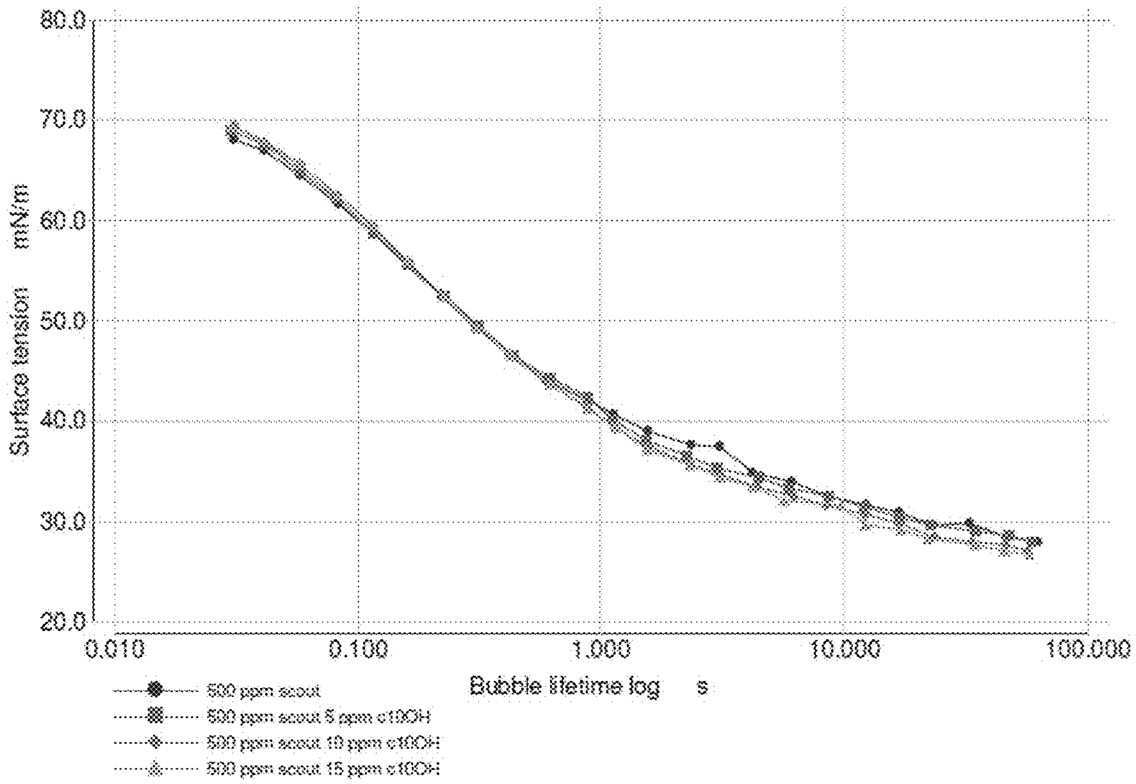
FIG. 11 is a graph showing the effect of adding a low level of C10 alcohol to a mixed system, where there is a mix of anionic surfactant and perhaps also nonionic surfactant such as an amine oxide. As described earlier, the effect is more pronounced on cmc than dynamic surface tension.

Table 10 and FIG. 11 below summarize the effect of adding a low level of C10 alcohol to a mixed system, where there is a mix of anionic surfactant and perhaps also non-ionic surfactant such as an amine oxide. As described earlier on, the effect is more pronounced on cmc than dynamic surface tension.

TABLE 18

Effect of adding low level of C10 alcohol to 500 ppm active surfactants mixture (3:1 active anionic surfactants to AO) DST (~60 sec. bubble life time)

| | Test 1 (mN/m) | Test 2 (mN/m) | Ave (mN/m) |
|---|---|---|---|
| 500 ppm Mixture (SLES:AOS:AO = 15:27:14) | 27.9 | 27.9 | 27.9 |
| 500 ppm Mixture + 5 ppm C10OH | 27.9 | 27.7 | 27.8 |
| 500 ppm Mixture + 10 ppm C10OH | 27.0 | 27.2 | 27.1 |
| 500 ppm Mixture + 15 ppm C10OH | 26.8 | 26.8 | 26.8 |

Solid Compositions

It cannot be overemphasized that the dissolution of the medium to long chain linear alcohol in a surfactant solution takes time in stirring/agitation and quite often heat. Therefore, in solid compositions, special attention needs to be directed to processing. If the medium to long chain linear alcohol is not properly incorporated, the dispensing system may not be able to work the medium to long chain linear alcohols into the mixed micellar structures.

One preferred processing method is to coat the medium to long chain alcohol onto a solid anionic surfactant. We have completed SLS needles coated with Sudan Red dyed C12 alcohol. The C12 alcohol is melted and dyed and used to coat the SLS needles.

Surprisingly, the medium chain alcohol was readily solubilized (uniform pink solution) when a 1% SLS solution was prepared with the material. Further examples with LAS, and AOS solids followed the same trend.

Another preferred method is for a "polymer melt" solid product when all surfactant ingredients and the medium and long chain linear alcohol are melted and thoroughly mixed and poured into a capsule or container.

The inventions being thus described, it will be obvious that the same may be varied in many ways. Such variations are not to be regarded as a departure from the spirit and scope of the inventions and all such modifications are intended to be included within the scope of the following claims.

The above specification provides a description of the manufacture and use of the disclosed compositions and methods. Since many embodiments can be made without departing from the spirit and scope of the invention, the invention resides in the claims.

What is claimed is:

1. A cleaning composition comprising:

a surfactant system comprising:

a high foaming anionic surfactant present in the composition from about 20 wt. % to about 50 wt. %;

a C9-C11 linear alcohol booster, wherein the ratio of linear alcohol to anionic surfactant is between about 1:100 and 2:100; and an amine oxide surfactant;

a coupling agent;

a divalent ion; and a humectant, wherein the composition is essentially free of an alcohol longer than C12.

2. The cleaning composition of claim 1, wherein the cleaning composition is a liquid and wherein the anionic surfactant comprises from about 25 wt. % to about 45 wt. % of the cleaning composition.

3. The cleaning composition of claim 1, wherein said coupling agent is present in an amount of from about 0.05 wt. % to about 5 wt. %.

4. The cleaning composition of claim 1, wherein said divalent ion is present in an amount of from about 0.1 wt. % to about 8 wt. %.

5. The cleaning composition of claim 1, wherein said humectant is present in an amount of from about 4 wt. % to about 30 wt. %.

6. The cleaning composition of claim 1, further comprising a nonionic surfactant.

7. The cleaning composition of claim 1, wherein said composition is essentially free of a nonlinear alcohol.

8. The cleaning composition of claim 1, wherein said composition is essentially free of an alcohol that is shorter than C6.

9. The cleaning composition of claim 1 wherein said composition is free of propylene glycol.

10. The cleaning composition of claim 1, wherein said coupling agent comprises an aromatic sulfonate.

11. The cleaning composition of claim 1, wherein the coupling agent is sodium xylene sulfonate.

12. The cleaning composition of claim 1, wherein said humectant is hexylene glycol.

* * * * *